United States Patent
Aoyagi et al.

(10) Patent No.: US 7,777,806 B2
(45) Date of Patent: Aug. 17, 2010

(54) CAMERA, METHOD, AND PROGRAM WHICH CAPTURES A FIELD OF AN OBJECT TO GENERATE AN IMAGE, AND IMAGE PROCESSING PROGRAM AND IMAGING DEVICE FOR APPLYING IMAGE PROCESSING TO AN IMAGE

(75) Inventors: Hidehiko Aoyagi, Kawasaki (JP); Masaru Muramatsu, Kawasaki (JP); Yuko Hattori, Kawasaki (JP)

(73) Assignee: Nikon Corporation, Tokyo (JP)

( * ) Notice: Subject to any disclaimer, the term of this patent is extended or adjusted under 35 U.S.C. 154(b) by 841 days.

(21) Appl. No.: 11/047,610

(22) Filed: Feb. 2, 2005

(65) Prior Publication Data
US 2005/0206750 A1    Sep. 22, 2005

Related U.S. Application Data

(63) Continuation-in-part of application No. 10/902,180, filed on Jul. 30, 2004, now abandoned.

(30) Foreign Application Priority Data

Aug. 6, 2003 (JP) ............................. 2003-206364
Feb. 4, 2004 (JP) ............................. 2004-028023

(51) Int. Cl.
H04N 5/238 (2006.01)
H04N 9/68 (2006.01)
G03B 13/00 (2006.01)

(52) U.S. Cl. .................... 348/365; 348/345; 348/238

(58) Field of Classification Search ............. 348/221.1, 348/362–366, 238, 234, 208.99; 396/213, 396/234
See application file for complete search history.

(56) References Cited

U.S. PATENT DOCUMENTS

| 4,636,054 A | * | 1/1987 | Saegusa | 396/234 |
| 4,796,043 A | * | 1/1989 | Izumi et al. | 396/121 |
| 5,678,079 A | * | 10/1997 | Ogawa | 396/234 |
| 6,859,621 B2 | * | 2/2005 | Ueyama | 396/213 |
| 6,943,840 B1 | * | 9/2005 | Tagawa | 348/333.01 |
| 7,199,830 B1 | | 4/2007 | Tanaka et al. | |

(Continued)

FOREIGN PATENT DOCUMENTS

JP    A-63-170628    7/1988

(Continued)

*Primary Examiner*—David L Ometz
*Assistant Examiner*—Ahmed A Berhan
(74) *Attorney, Agent, or Firm*—Oliff & Berridge, PLC

(57) ABSTRACT

A digital still camera according to the present invention can obtain an image with appropriate brightness easily without an increase in memory capacity. The digital still camera of the present invention includes: an image-capturing unit which captures a field of object to generate an image; a photometry unit which measures a luminance of a predetermined area of the field of object; a calculating unit which calculates a ratio between a luminance value of a portion of the image captured according to the luminance measured by the photometry unit, and a target luminance value of the predetermined area, the portion corresponding to the predetermined area; and a correcting unit which corrects the image generated by the image-capturing unit according to the ratio.

11 Claims, 16 Drawing Sheets

U.S. PATENT DOCUMENTS

2002/0140840 A1* 10/2002 Kindaichi .................. 348/348
2004/0066464 A1    4/2004 Ueyama

FOREIGN PATENT DOCUMENTS

| JP | A-09-281543 | 10/1997 |
| JP | A 11-008796 | 1/1999 |
| JP | A 2000-069356 | 3/2000 |
| JP | A-2002-330334 | 11/2002 |
| JP | A 2004-133006 | 4/2004 |

* cited by examiner

FIG.13

| LENS | SCENE | EXPOSURE CORRECTION COEFFICIENT |
|---|---|---|
| LENS A | 1 | 1.5 |
| | 2 | 1.5 |
| | 3 | 1.4 |
| | 4 | 1.5 |
| | 5 | 1.5 |
| | ⋮ | ⋮ |
| LENS B | 1 | 0.8 |
| | 2 | 1.5 |
| | 3 | 2.0 |
| | 4 | 1.2 |
| | 5 | 1.0 |
| | ⋮ | ⋮ |

CAMERA, METHOD, AND PROGRAM WHICH CAPTURES A FIELD OF AN OBJECT TO GENERATE AN IMAGE, AND IMAGE PROCESSING PROGRAM AND IMAGING DEVICE FOR APPLYING IMAGE PROCESSING TO AN IMAGE

BACKGROUND OF THE INVENTION

1. Field of the Invention

The present invention relates to a digital still camera which captures a field of object to generate an image, and to an image processing program for applying image processing to an image as well as an imaging device and a method and a program therefor.

2. Description of the Related Art

Conventionally, a digital still camera measures the luminance of a field of object by using a photometry device or the like, and determine exposure, aperture, and other shooting conditions based on the result of measurement. Then, the digital still camera controls respective parts to achieve the determined conditions. However, errors may sometimes occur in such a control, failing to make an expected control according to the determined conditions. If the respective parts are not controlled according to the determined conditions, the resulting image may have loss of white gradation in highlight areas, loss of black gradation in shadow areas, etc.

To solve such a problem, Japanese Unexamined Patent Application Publication No. 2002-330334 has described an image capturing apparatus which estimates the amounts of error for respective possible apertures in advance for storage, and read out the stored amount of error for each aperture at the control over respective parts, thereby correcting the shutter speed, the gain of the image-capturing device, and the like in accordance with the read amount of error.

Nevertheless, it is troublesome to measure in advance the amounts of error for the respective apertures for storage as described above; moreover, it requires memories for storing them. Besides, the conditions of the aperture mechanism will change over time due to abrasion or the like, so that the amounts of errors therein may also change and become different from ones stored in advance, making the stored amounts useless.

Moreover, if the invention disclosed in the above-mentioned reference is applied to a digital still camera with interchangeable lens system, it is necessary to measure the amounts of error in advance for all of lenses and all of respective apertures for storage. Therefore, it takes more time and trouble, and memories of a larger capacity are required for storage. Furthermore, with interchangeable lens having no CPU, the digital still camera cannot specify what kind of interchangeable lens is mounted thereon.

SUMMARY OF THE INVENTION

An object of the present invention is to provide a digital still camera which can obtain an image with proper brightness easily without an increase in memory capacity as well as an image processing program therefor and an imaging device and a method and a program therefor.

To achieve the foregoing object, a digital still camera of the present invention includes: an image-capturing unit which captures a field of object to generate an image; a photometry unit which measures a luminance of a predetermined area of the field of object; a calculating unit which calculates a ratio between a luminance value of a portion of the image captured according to the luminance measured by the photometry unit and a target luminance value of the predetermined area; and a correcting unit which corrects the image generated by the image-capturing unit according to the ratio, the portion of the image corresponding to the predetermined area.

Moreover, to achieve the foregoing object, an image processing program of the present invention causes a computer to execute the steps of: acquiring an image to be processed and a photometry area of a field of object as a condition in which the image is captured; calculating a ratio between a luminance value of a portion of the image to be processed and a target luminance value of a predetermined area, the portion of the image corresponding to the photometric area; and correcting the image to be processed according to the ratio.

To achieve the foregoing object, a first imaging device of the present invention includes: an exposure adjusting part calculating a proper exposure based on a result of photometry, and adjusting an exposure at a time of image capturing so as to obtain the image with the proper exposure; an image-capturing part capturing an image in accordance with an adjustment by the exposure adjusting part; a first calculating part calculating a luminance of a predetermined region of an image captured by the image-capturing part, based on data of the image captured by the image-capturing part; a second calculating part calculating a luminance of the predetermined region based on the proper exposure calculated by the exposure adjusting part; and an image correcting part correcting the image captured by the image-capturing part according to a difference between the luminance calculated by the first calculating part and the luminance calculated by the second calculating part.

The first imaging device of the present invention may further include: a memory part storing a correction coefficient calculated by the image correcting part in correcting the image, in association with discrimination information on a lens that is mounted when the image is captured; and a controlling part acquiring discrimination information on a mounted lens, and controlling an exposure adjustment by the exposure adjusting part according to the correction coefficient which is stored in the memory part in association with the acquired discrimination information.

The first imaging device of the present invention may further include a decision part deciding a type of a subject of the image captured by the image-capturing part. Here, the image correcting part corrects the image captured by the image-capturing part according to the type of the subject of the image decided by the decision part.

Moreover, to achieve the foregoing object, an image-capturing method of the present invention includes: an exposure adjusting step of calculating a proper exposure based on a result of photometry, and adjusting an exposure at a time of image capturing so as to obtain an image with the proper exposure; an image-capturing step of capturing an image in accordance with an adjustment made in the exposure adjusting step; a first calculating step of calculating a luminance of a predetermined region of an image captured in the image-capturing step, based on data of the image captured in the image-capturing step; a second calculating step of calculating a luminance of the predetermined region based on the proper exposure calculated in the exposure adjusting step; and an image correcting step of correcting the image captured in the image-capturing step according to a difference between the luminance calculated in the first calculating step and the luminance calculated in the second calculating step.

Moreover, to achieve the foregoing object, a program of the present invention includes: an exposure adjusting step of calculating a proper exposure based on a result of photometry, and adjusting an exposure at a time of image capturing so as to obtain an image with the proper exposure; an image-capturing step of capturing an image in accordance with an adjustment made in the exposure adjusting step; a first calculating step of calculating a luminance of a predetermined region of an image captured in the image-capturing step, based on data of the image captured in the image-capturing step; a second calculating step of calculating a luminance of the predetermined region according to the proper exposure calculated in the exposure adjusting step; and an image correcting step of correcting the image captured in the image-capturing step according to a difference between the luminance calculated in the first calculating step and the luminance calculated in the second calculating step.

To achieve the foregoing object, a second imaging device of the present invention includes: an exposure adjusting part calculating a proper exposure based on a result of photometry, and adjusting an exposure at a time of image capturing so as to obtain the image with the proper exposure; an image-capturing part capturing an image in accordance with an adjustment by the exposure adjusting part; a first calculating part calculating a luminance of a predetermined region of an image captured by the image-capturing part, based on data of the image captured by the image-capturing part; a second calculating part calculating a luminance of the predetermined region according to the proper exposure calculated by the exposure adjusting part; a third calculating part calculating a correction coefficient to be used to correct the image captured by the image-capturing part, according to a difference between the luminance calculated by the first calculating part and the luminance calculated by the second calculating part; and a memory controlling part storing the data of the image captured by the image-capturing part and the correction coefficient calculated by the third calculation part into a recording medium.

BRIEF DESCRIPTION OF THE DRAWINGS

FIG. 13 is a chart showing an example of history of exposure correction coefficients;

DESCRIPTION OF THE PREFERRED EMBODIMENTS

First Embodiment

Hereinafter, a first embodiment of the present invention will be described with reference to the drawings.

Figure 1:
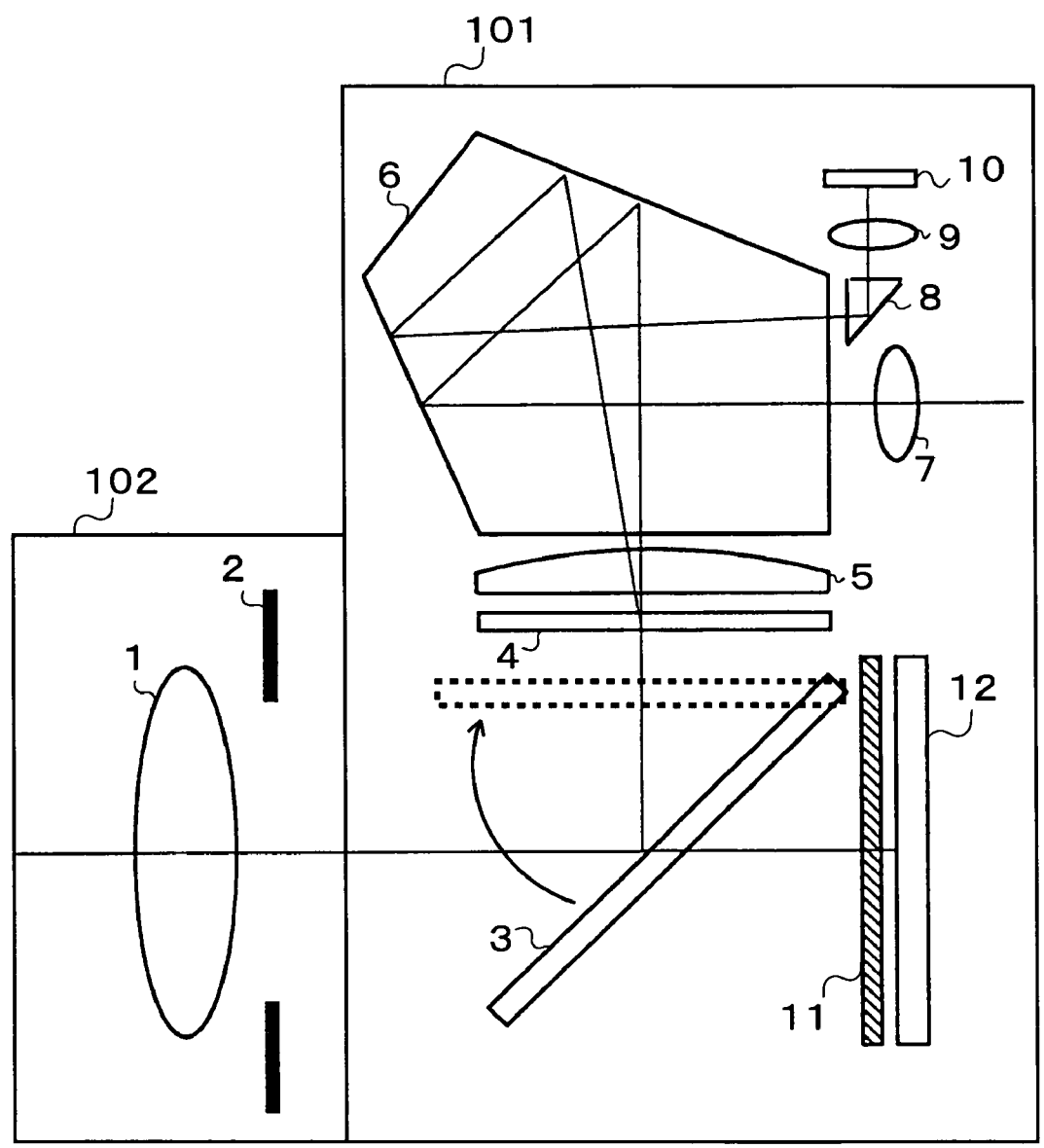
FIG. 1 is a schematic block diagram of a digital still camera according to a first embodiment.

FIG. 1 is a schematic block diagram of a digital still camera 100 according to the first embodiment. The digital still camera 100 is composed of a camera body 101 and a shooting lens 102. The shooting lens 102 can be detachably mounted on the camera body 101, and has a lens 1 and an aperture stop 2 inside. Incidentally, shooting lenses other than the shooting lens 102 can also be detachably mounted on the camera body 101.

The camera body 101 is a single-lens reflex camera, including a quick return mirror 3, a diffusion screen 4 (focusing screen), a condensing lens 5, a pentaprism 6, an eyepiece 7, a photometry prism 8, a photometry lens 9, a photometry device 10, a shutter 11, and an image-capturing device 12.

During non-shooting, the quick return mirror 3 is arranged at an angle of 45o to an optical axis as shown in FIG. 1. Then, with the shooting lens 102 mounted on the camera body 101, the light beam passing through the lens 1 and the aperture stop 2 is reflected by the quick return mirror 3 and led to the eyepiece 7 via the diffusion screen 4, the condensing lens 5, and the pentaprism 6. Moreover, part of the light beam is diffused by the diffusion screen 4 and led to the photometry device 10 through the condensing lens 5, the pentaprism 6, the photometry prism 8, and the photometry lens 9.

On the other hand, at shooting, the quick return mirror 3 retreats to the position shown by the broken line to release the shutter 11. The light beam from the shooting lens 102 is led to the image-capturing device 12. The image-capturing device 12 is a photoreceptor device such as a charge coupled device (CCD).

Figure 2:
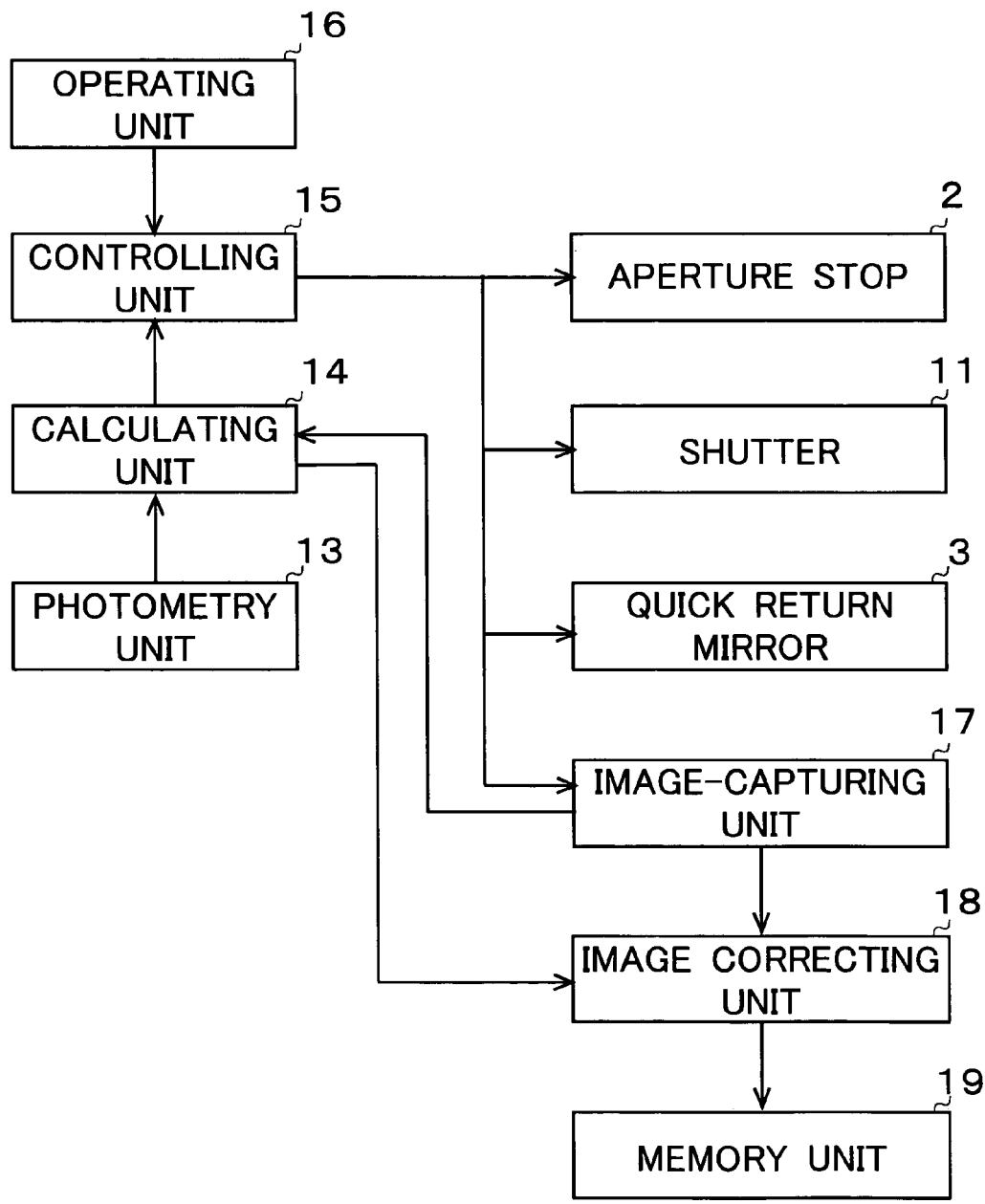
FIG. 2 is a functional block diagram of the digital still camera according to the first embodiment.

FIG. 2 is a functional block diagram of the digital still camera 100. The digital still camera 100 includes a photometry unit 13, a calculating unit 14, a controlling unit 15, an operating unit 16, an image-capturing unit 17, an image correcting unit 18, and a memory unit 19.

The photometry unit 13 includes the photometry prism 8, the photometry lens 9, and the photometry device 10 of FIG. 1. It measures luminances of the field of object, and outputs them to the calculating unit 14. The calculating unit 14 calculates parameters and the like for controlling the components (details will be given later) according to the outputs of the photometry unit 13 and of the image-capturing unit 17 to be described later, and outputs the results of calculation to the controlling unit 15 and the image correcting unit 18.

The controlling unit 15 drives the aperture stop 2, the quick return mirror 3, and the shutter 11 individually according to the results of calculation by the calculating unit 14. The operating unit 16 is provided with a release button, a setup button for a user to set an exposure compensation value (details will be given later), and so on, which are not shown. The output of the operating unit 16 is connected to the controlling unit 15.

The image-capturing unit 17 includes the image-capturing device 12 of FIG. 1. It captures the field of object through the shooting lens 102, and outputs image data to the image correcting unit 18. The image-capturing unit 17 also outputs data on the captured image to the calculating unit 14. The image correcting unit 18 corrects the image data output from the image-capturing unit 17 according to the results of calculation of the calculating unit 14 (details will be given later), and outputs the resultant to the memory unit 19.

The memory unit 19 is a recording medium such as a memory card (card-like removable memory). It records thereon the image data corrected by the image correcting unit 18. The memory unit 19 may be an internal memory.

Figure 3:
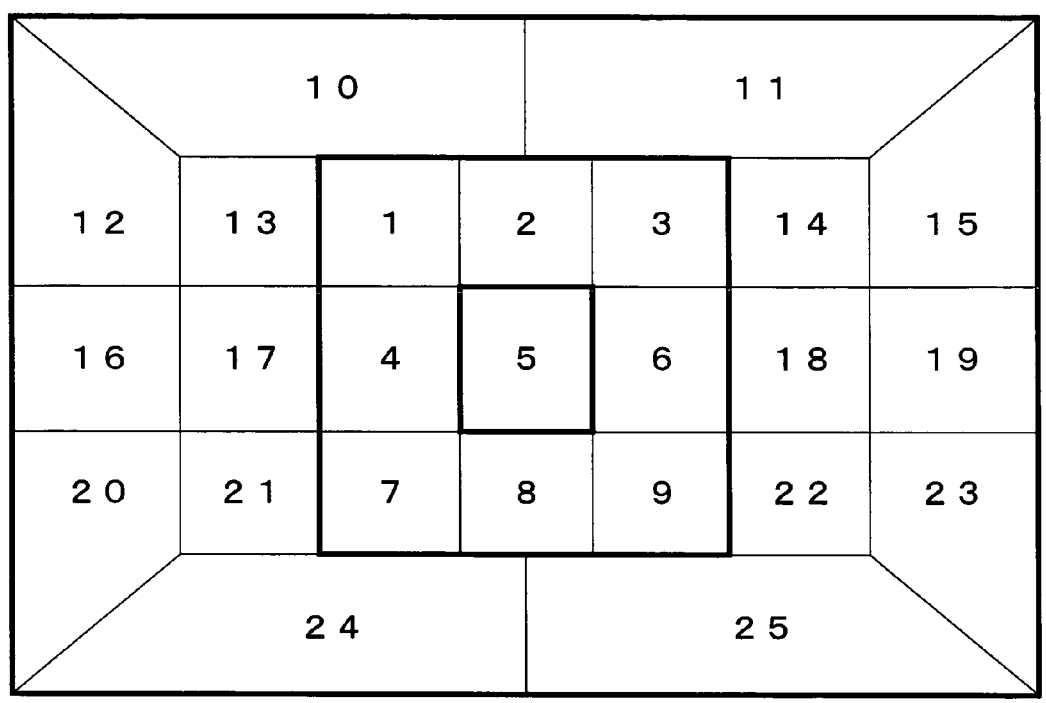
FIG. 3 is a diagram for explaining a photometry device.

The photometry device 10 included in the photometry unit 13 is a photoreceptor device such as a silicon photo diode (SPD) and a CCD, and corresponds to a multi-area photometry sensor shown in FIG. 3. The photometry device 10 divides the field of object into 25 areas and makes photometry of almost the entire field to obtain respective values BV(1) to BV(25) of the areas. The digital still camera 100 has three photometry modes as to the photometry using such a photometry device 10. The three photometry modes, namely, are a centerweighted photometry mode, a spot photometry mode, and a multi-area photometry mode. These photometry modes are set by the user through the operating unit 16.

Incidentally, the lens 1, the aperture stop 2, the quick return mirror 3, the shutter 11, the image-capturing device 12, and the controlling unit 15 correspond to the image-capturing unit in claims. The photometry prism 8, the photometry lens 9, the photometry device 10, and the photometry unit 13 correspond to the photometry unit in claims. The calculating unit 14 corresponds to the calculating unit in claims. The image correcting unit 18 corresponds to the correcting unit in claims. The controlling unit 15 and the operating unit 16 correspond to the setup unit in claims. Moreover, the individual areas of the photometry device 10 in FIG. 3 correspond to the plurality of areas in claims.

Figure 4:
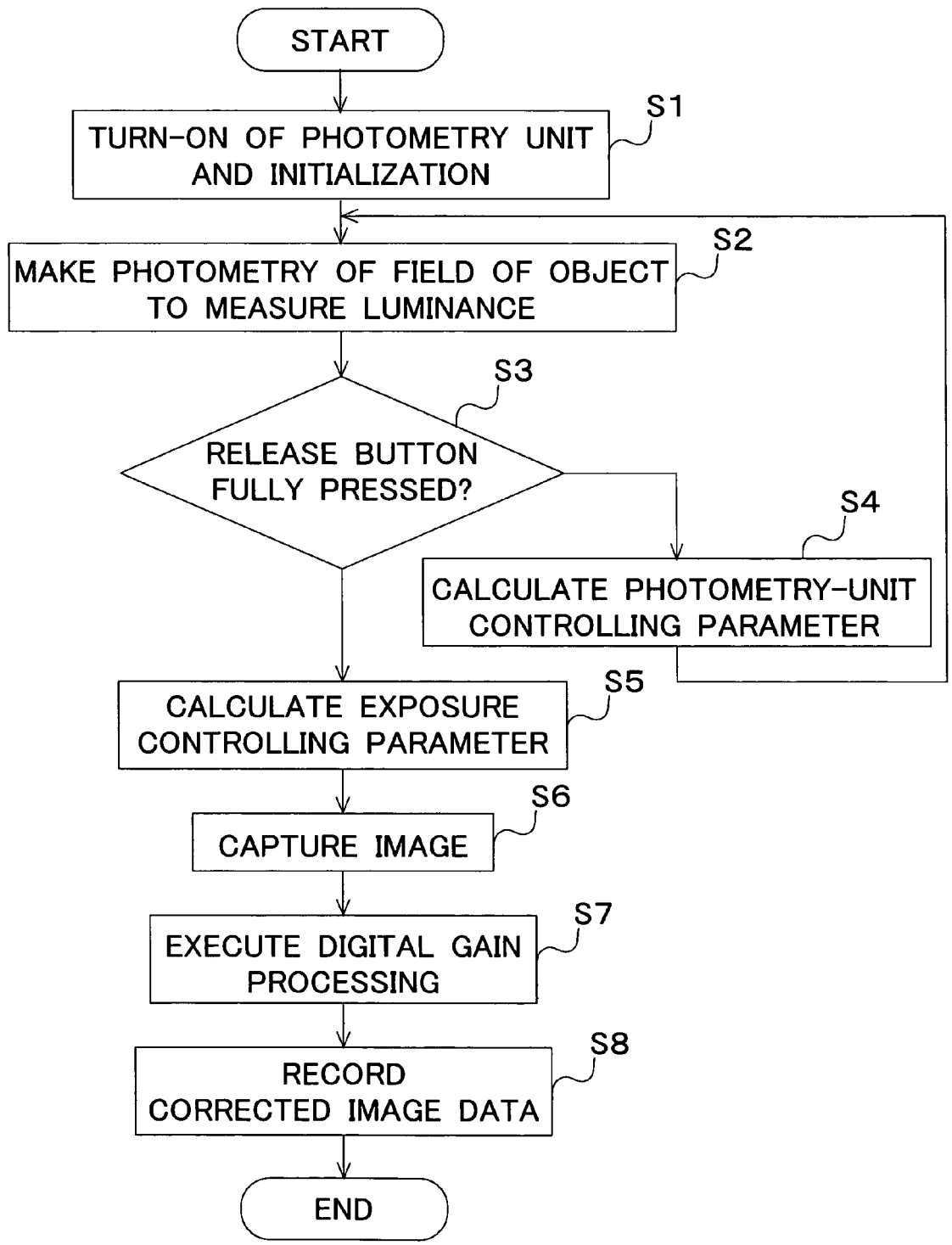
FIG. 4 is a flowchart showing the operation of the digital still camera according to the first embodiment.

With reference to the flowchart shown in FIG. 4, description will be given of the shooting operations of the digital still camera 100 having the configuration described above. The series of operations in the flowchart of FIG. 4 is started upon the not-shown release button pressed halfway.

When the not-shown release button is pressed halfway by the user, at step S1, the digital still camera 100 turns on the photometry device 10 of the photometry unit 13 and performs a predetermined initializing operation.

At step S2, the photometry device 10 of the photometry unit 13 makes photometry of the field of object through the photometry prism 8 and the photometry lens 9, thereby obtaining luminances. Here, the photometry unit 13 performs photometry in compliance with the photometry mode set by the user.

When the user sets the centerweighted photometry mode, the photometry device 10 of the photometry unit 13 makes photometry of the areas 1 to 9 which fall generally on round center of the photometry device in FIG. 3, and obtains the luminance values BV(1) to BV(9). When the user sets the spot photometry mode, the photometry unit 13 makes photometry of the spot area 5 which is a central area of the photometry device in FIG. 3, and obtains the luminance value BV(5). When the user sets the multi-area photometry mode, the photometry device 10 of the photometry unit 10 makes photometry of the entire areas 1-25 of the photometry device in FIG. 3, and obtains the luminance values BV(1) to BV(25). The areas to be measured in each photometry mode correspond to the predetermined area in claims. Note that which areas to measure during each of set photometry modes is not limited to this example.

At step S3, the controlling unit 15 determines whether or not the not-shown release button is fully pressed by the user. If not fully pressed, the processing moves to step S4. If fully pressed, the processing moves to step S5.

At step S4, when the not-shown release button is not fully pressed by the user, the calculating unit 14 calculates photometry-unit controlling parameters.

The photometry-unit controlling parameters represent photometry conditions in the photometry unit 13, an amplifier gain when the photometry device 10 of the photometry unit 13 is an SPD, and an amplifier gain and a storing time when the photometry device 10 is a CCD. The calculating unit 14 calculates the photometry-unit controlling parameters, and outputs them to the photometry unit 13.

At step S4, the calculating unit 14 determines the condition for the next photometry based on the result of the photometry at step S2. This makes it possible for the photometry unit 13 to perform optimum photometry for the current camera situation.

The digital still camera 100 repeats the photometry and the calculation of the photometry-unit controlling parameters until the not-shown release button is fully-pressed by the user (YES at step S3). Upon the full press on the not-shown release button by the user, the processing moves to step S5.

At step S5, upon the full press on the not-shown release button by the user, the calculating unit 14 calculates exposure controlling parameters. The exposure controlling parameters represent a shutter speed and an aperture. The calculating unit 14 initially calculates a representative luminance value according to the luminance values measured by the photometry unit 13, and calculates the exposure controlling parameters according to the representative luminance value. The representative luminance value is representative of values of a plurality of photometry areas to be measured, with the individual luminance values measured by the photometry unit 13 taken into consideration.

The calculating unit 14 initially calculates the representative luminance value according to the luminance values which the photometry unit 13 has measured in compliance with the current photometry mode. When the centerweighted photometry mode is set by the user, the calculating unit 14 calculates a representative luminance value BVcw in the centerweighted photometry mode based on the luminance values BV(1) to BV(9). When the spot photometry mode is set by the user, the calculating unit 14 calculates a representative luminance value BVsp in the spot photometry mode based on the luminance value BV(5). Moreover, when the multi-area photometry mode is set, the calculating unit 14 calculates a representative luminance value BVa in the multi-area photometry mode based on the luminance values BV(1) to BV(25), and also calculates the luminance value BVcw based on the luminance values BV(1) to BV(9) as in the centerweighted photometry mode.

These representative luminance values (BVcw, BVsp, BVa) are calculated, for example, by the same methods as disclosed in Japanese Unexamined Patent Application Publication Nos. Hei 9-281543 and Sho 63-170628.

Next, the calculating unit 14 calculates the shutter speed and the aperture as the exposure controlling parameters, according to the calculated representative luminance value. The calculating unit 14 has in advance arithmetic expressions for calculating the shutter speed and the aperture according to the representative luminance value. Then, the calculating unit 14 outputs the shutter speed and the aperture calculated to the controlling unit 15 as the exposure controlling parameters.

At step S6, the controlling unit 15 and the image-capturing unit 17 capture the field of object. The controlling unit 15 controls the aperture stop 2, the shutter 11, and the quick return mirror 3 in accordance with the shutter speed and the aperture calculated by the calculating unit 14. The image-capturing unit 17 captures the field of object. Here, it is assumed that there is some error in the controlling unit 15's control over the aperture stop 2 and the shutter 11. Then, to reduce this error, at step S7 the calculating unit 14 and the image correcting unit 18 perform digital gain processing.

Figure 5:
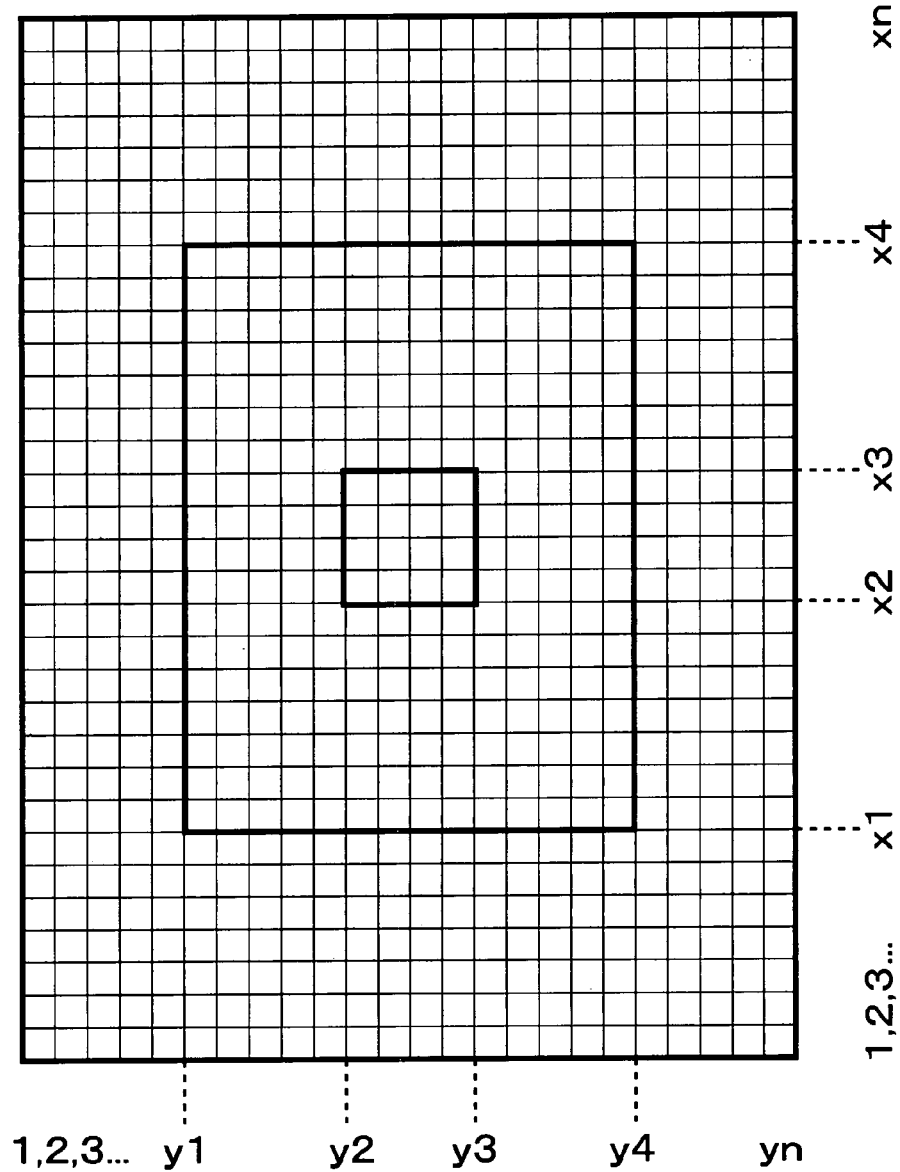
FIG. 5 shows an image-capturing device of an image-capturing unit.

FIG. 5 shows an image-capturing device of the image-capturing unit 17. Each single cell in FIG. 5 corresponds to a pixel of the image-capturing device 12. From each of the pixels image data on a red component (R component), a green component (G component), and a blue component (B component) are outputted to an image correcting unit 18.

Initially, the calculating unit 14 determines the luminance values Y of the respective pixels by using the following equation:

$$Y[i,j] = Kr \times Dr[i,j] + Kg \times Dg[i,j] + Kb \times Db[i,j] \quad \text{(Eq. 1)}$$

In Eq. 1, i and j indicate pixel numbers. Dr is the image data on the R component, Dg the image data on the G component, and Db the image data on the B component. Kr, Kg, and Kb are predetermined coefficients for determining a luminance value from the image data.

Next, the calculating unit 14 and the image correcting unit 18 correct the image data in compliance with the photometry mode set by the user.

(1) In Centerweighted Photometry Mode

The calculating unit 14 corrects the image data output from the image-capturing unit 17 by using the following equation:

$$DA = DB \times \{(TgY \times 2^H)/AveYcw\}. \quad \text{(Eq. 2)}$$

In Eq. 2, DA is the corrected image data, and DB is the image data (yet to be corrected) output from the image-capturing unit 17. TgY is a predetermined luminance value which is a basis for the target luminance value to be described later in detail. H is an exposure compensation value. AveYcw is the average of luminance values of a portion of the image data output from the image-capturing unit 17, the portion corresponding to the areas to be measured by the photometry unit 13. AveYcw is calculated by using the following equation:

$$AveYcw = (\Sigma Y[i,j])/\{(x4-x1+1) \times (y4-y1+1)\}. \quad \text{(Eq. 3)}$$

In Eq. 3, i=x1 to X4 and j=y1 to y4.

The data on the area, i=x1 to x4 and j=y1 to y4 is a portion of the image data output from the image-capturing unit 17, the portion corresponding to the areas to be measured in the centerweighted photometry mode (areas 1-9 in FIG. 3). The average of the luminance values of this portion of the image data is calculated By Eq. 3.

TgY in Eq. 2 is a luminance value which is determined in advance such that image data obtained from a uniformly gray (halftone) subject appear in preferable gray, i.e. is reproduced in halftone. The exposure compensation value H is set by the user via the operating unit 16. For example, the user can compensate the exposure as he/she likes by shifting this compensation value by +1 or −2 from the proper exposure to a brighter side or dimmer side. This exposure compensation value corresponds to the condition for exposure compensation in claims.

Note that $(TgY \times 2^H)$ in Eq. 2 corresponds to the target luminance value in claims. In Eq. 2, TgY is multiplied by $2^H$ so as to reflect the user's intended exposure in the correction.

By the correction using Eq. 2, with the luminance value (AveYcw) obtained from the image data smaller than $(TgY \times 2^H)$, the entire image can be corrected to have a brighter color. With the luminance value (AveYcw) obtained from the image data greater than $(TgY \times 2^H)$, the entire image can be corrected to have a dimmer color.

(2) In Spot Photometry Mode

The calculating unit 14 corrects the image data output from the image-capturing unit 17 by using the following equation:

$$DA = DB \times \{(TgY \times 2^H)/AveYsp\}. \quad \text{(Eq. 4)}$$

In Eq. 4, DA is the corrected image data, and DB is the image data (yet to be corrected) output from the image-capturing unit 17. TgY and H are the same as those in the centerweighted photometry mode. AveYsp is the average of luminance values of a portion of the image data output from the image-capturing unit 17, the portion corresponding to the area to be measured by the photometry unit 13. AveYsp is calculated by the following equation:

$$AveYsp = (\Sigma Y[i,j])/\{(x3-x2+1) \times (y3-y2+1)\}. \quad \text{(Eq. 5)}$$

In Eq. 5, i=x2 to X3 and j=y2 to y3. The data on the area, i=x2 to x3 and j=y2 to y3 is a portion of the image data output from the image-capturing unit 17, the portion corresponding to the area to be measured in the spot photometry mode (area 5 in FIG. 3). By Eq. 5, the average of the luminance values of this portion of the image data is calculated.

Note that $(TgY \times 2^H)$ in Eq. 4 corresponds to the target luminance value in claims. In Eq. 4, TgY is multiplied by $2^H$ for the same reason as described in (1). By the correction using Eq. 4, with the luminance value (AveYsp) obtained from the image data smaller than $(TgY \times 2^H)$, the entire image can be corrected to have a brighter color. With the luminance value (AveYsp) obtained from the image data greater than $(TgY \times 2^H)$, the entire image can be corrected to have a dimmer color.

(3) In Multi-Area Photometry Mode

The calculating unit 14 corrects the image data output from the image-capturing unit 17 by using the following equation:

$$DA = DB \times \{(TgM \times 2^H)/AveYcw\}. \quad \text{(Eq. 6)}$$

In Eq. 6, DA is the corrected image data, and DB is the image data (yet to be corrected) output from the image-capturing unit 17. H is the same as that in the centerweighted photometry mode. In the multi-area photometry mode, the entire image corresponds to the areas to be measured by the photometry unit 13. Nevertheless, as in Eq 6, for the correction used is not the average of the luminance values of the entire image data but AveYcw described in (1), Eq. 3.

TgM is a luminance value which is a basis for the target luminance value in the multi-area photometry mode. TgM is calculated by the following equation:

$$TgM = TgY \times 2^{(BVcw-BVa)}. \quad \text{(Eq. 7)}$$

In Eq. 7, TgY is the same as that described in the centerweigted and spot photometry modes. BVcw is the same luminance value as the representative luminance value in the centerweighted photometry mode. BVa is the representative luminance value in the multi-area photometry mode. BVcw corresponds to the luminance of the first area in claims. BVa corresponds to the luminance of the second area in claims.

Note that $(TgM \times 2^H)$ in Eq. 6 corresponds to the target luminance value in claims. In Eq. 6, TgM is multiplied by $2^H$ for the same reason as described in (1). By the correction using Eq. 6, with the luminance value (AveYcw) obtained from the image data smaller than $(TgM \times 2^H)$, the entire image can be corrected to have a brighter color. With the luminance value (AveYcw) obtained from the image data greater than the target luminance value (TgM×$2^H$), the entire image can be corrected to have a dimmer color.

At step S8, the memory unit 19 records thereon the image data corrected by the image correcting unit 18 as described above and terminates the series of processing.

According to the first embodiment as has been described, luminances are measured of the area(s) of the field of object corresponding to the photometry mode (predetermined area in claims), and a ratio is calculated between the luminance value of the portion of the image output from the image-capturing unit 17 corresponding to the predetermined area(s) and the predetermined target luminance value. The image data output from the image-capturing unit 17 is corrected based on the ratio.

This eliminates the need to measure the amounts of error in advance for storage. It is therefore possible to obtain an image with appropriate brightness easily without an increase in memory capacity. Moreover, even with a camera with interchangeable lens system such as described in the first embodiment, an image with appropriate brightness is obtainable easily without an increase in memory capacity.

According to the first embodiment, in the multi-area photometry mode, TgM (the luminance value as a basis for the target luminance value) is determined from the representative luminance value BVa in the multi-area photometry mode (the luminance of the second area) and the luminance value BVcw calculated as in the centerweighted photometry mode (the luminance of the first area of the field of object) (see Eq. 7). Then, an image with appropriate brightness is obtainable by making the correction using this target luminance value.

According to the first embodiment, in the multi-area photometry mode, determining the target luminance value according to the luminance value BVa as a representative value of the luminances of a plurality of areas makes it possible to obtain an image with appropriate brightness easily.

According to the first embodiment, the target luminance value is determined based on the exposure value (condition for exposure compensation) set by the user. It is therefore possible to reflect the user's intended exposure in the target luminance value as well as to obtain an image with appropriate brightness easily without an increase in memory capacity.

The first embodiment has dealt with the case where the fixed luminance value TgY is used as the reference luminance value for the target luminance value in the centerweighted photometry mode and the spot photometry mode. Nevertheless, the luminance value may be modified as appropriate, for example, in accordance with a white balance mode.

Second Embodiment

Hereinafter, a second embodiment of the present invention will be described in detail with reference to the drawings. The same functional blocks as those of the first embodiment will be described below by using the same reference numbers as in the first embodiment.

Figure 6:
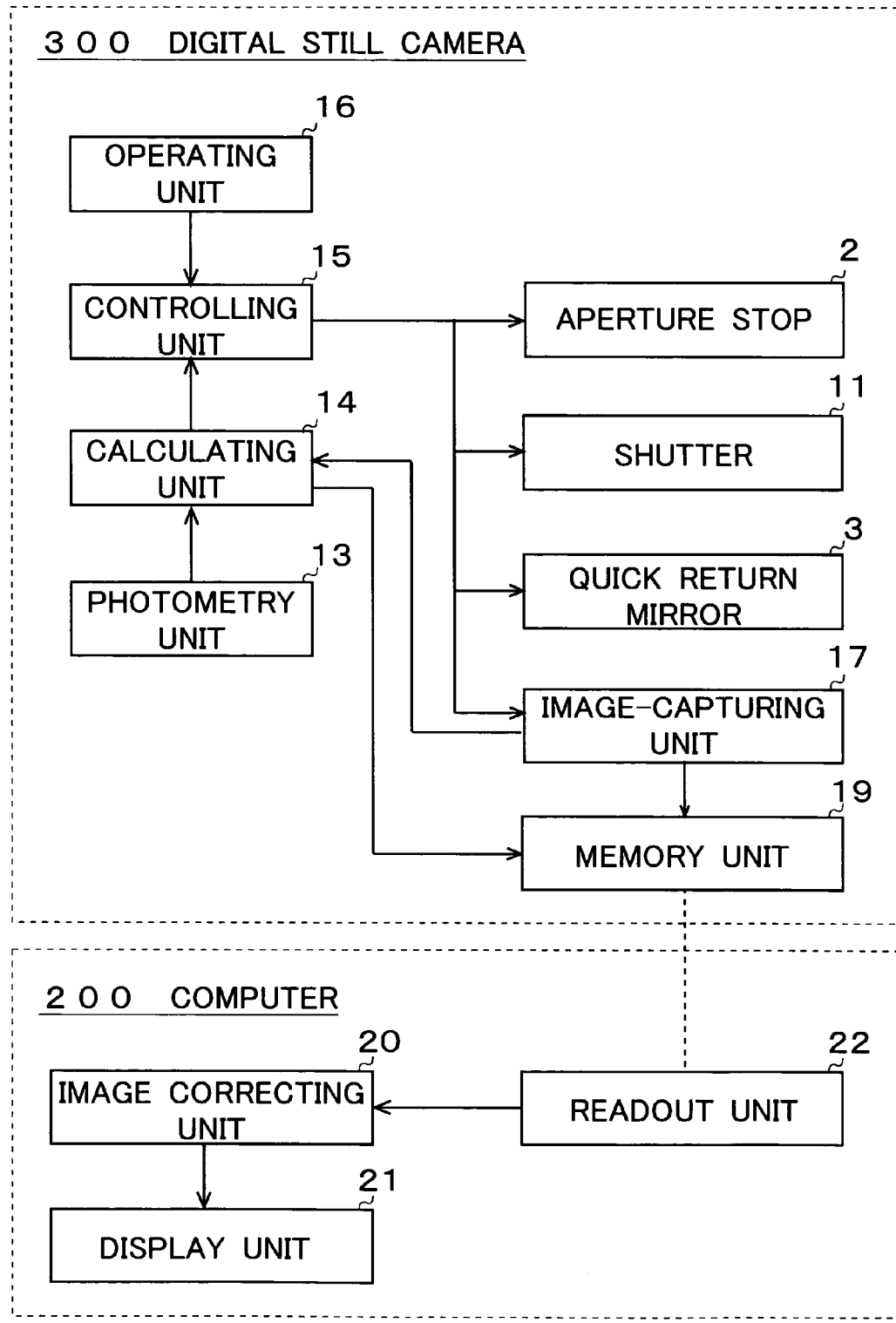
FIG. 6 is a functional block diagram of a computer according to a second embodiment.

FIG. 6 is a functional block diagram of a computer 200 according to the second embodiment. As shown in FIG. 6, the computer 200 includes an image correcting unit 20 and a display unit 21, as well as a readout unit 22 which can receive data and the like from exterior. An image processing program of the present invention is stored in the computer 200 in advance. According to this image processing program, the computer 200 performs image correction.

In FIG. 6, the computer 200 is connected to an external digital still camera 300 through the readout unit 22. The computer 200 acquires image data captured by the digital still camera 300, corrects the image data in the image correcting unit 20 through the steps described with reference to FIG. 4, and displays the resultant onto the display unit 21. Since the same correction method as in the first embodiment is used here, description thereof will be omitted.

However, the computer 200 also acquires, for instance, the photometry areas of the field of object as the conditions in which the image is captured, in addition to the image data obtained by image capturing (the image to be processed). The conditions are corrected by the same manner as described in the first embodiment with reference to FIG. 4.

The conditions in which the image is captured may be recorded as additional information on the image data, using such a file format as EXIF. The computer 200 may acquire the image to be processed not from the digital still camera 300 but from a memory card or other recording media.

As has been described, the second embodiment can provide the same effects as those of the first embodiment.

The second embodiment has dealt with the case where the correction is made through the steps as those in the flowchart of FIG. 4 according to the first embodiment. However, the computer 200 may perform only some of the steps shown in the flowchart of FIG. 4.

Third to fifth embodiments to be described below provide a first imaging device. This first imaging device (for example, a digital still camera 201 of FIG. 7) includes an exposure adjusting part (for example, an automatic exposure adjusting unit 212 of FIG. 7), an image-capturing part (for example, an image-capturing device 211 of FIG. 7), a first calculating part (for example, a luminance calculating unit 242 of FIG. 8, which performs processing of step S33 in FIG. 11), a second calculating part (for example, the luminance calculating unit 242 of FIG. 8, which performs processing of step S34 in FIG. 11), and an image correcting part (for example, a white balance adjusting unit 216 of FIG. 7). The exposure adjusting part calculates a proper exposure based on a result of photometry, and adjusts an exposure at a time of image capturing so as to obtain an image with the proper exposure. The image-capturing part captures an image in accordance with an adjustment by the exposure adjusting part. The first calculating part calculates a luminance of a predetermined region (region to be processed) of the image captured by the image-capturing part, based on data of the image captured by the image-capturing part. The second calculating part calculates a luminance of the predetermined region based on the proper exposure calculated by the exposure adjusting part. The image correcting part corrects the image captured by the image-capturing part based on a difference (for example, deviation) between the luminance calculated by the first calculating part and the luminance calculated by the second calculating part.

Figure 12:
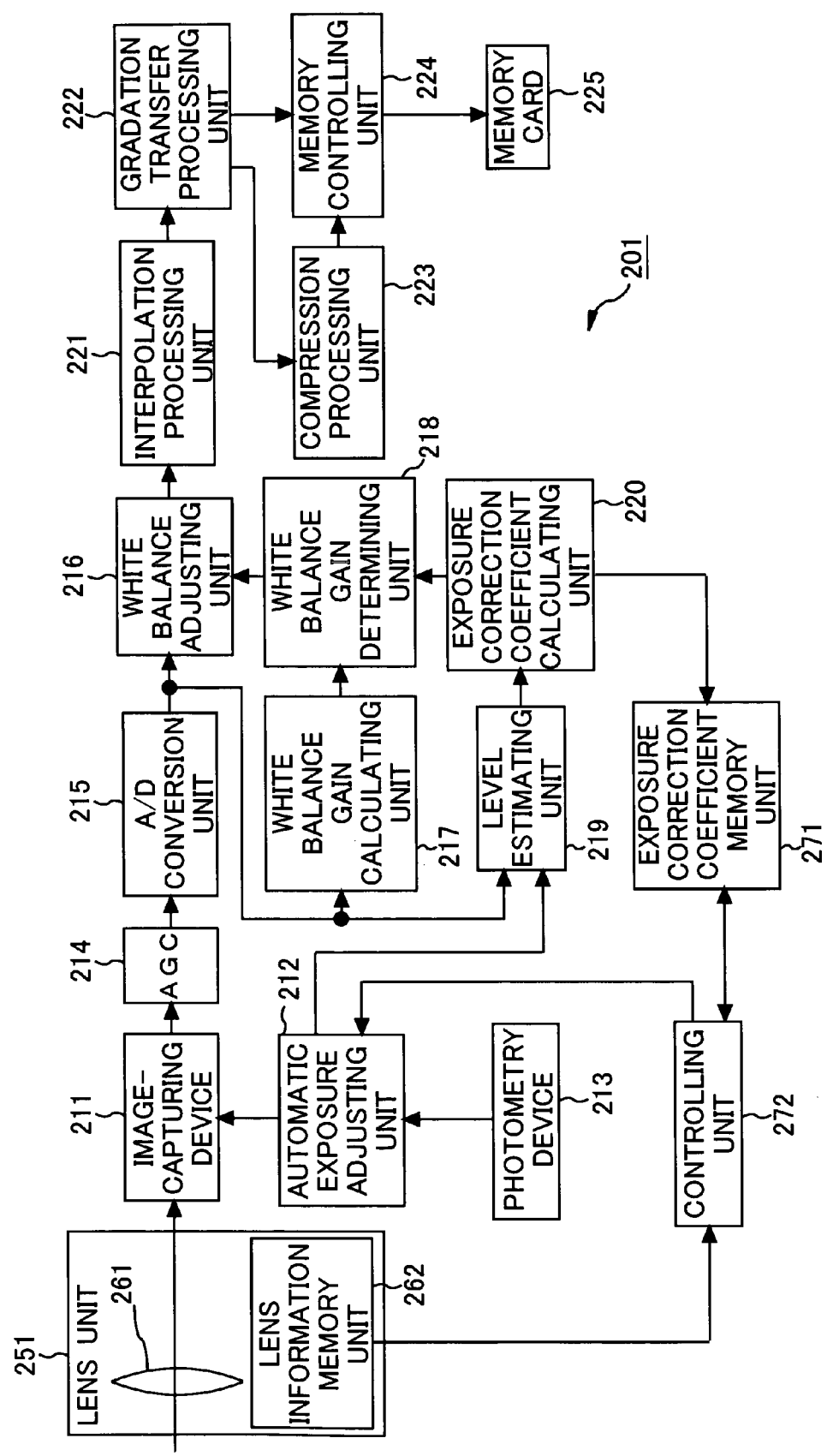
FIG. 12 is a block diagram showing another example of configuration of the digital still camera to which the present invention is applied.

The first imaging device may further include a memory part (for example, an exposure correction coefficient memory unit 271 of FIG. 12) and a controlling part (for example, a controlling unit 272 of FIG. 12). The memory part stores a correction coefficient (exposure correction coefficient) calculated by the image correcting part in correcting the image, in association with discrimination information on a lens that is mounted when the image is captured. The controlling part acquires discrimination information on a mounted lens, and controls an exposure adjustment by the exposure adjusting part based on the correction coefficient stored in the memory part in association with the acquired discrimination information.

Figure 16:
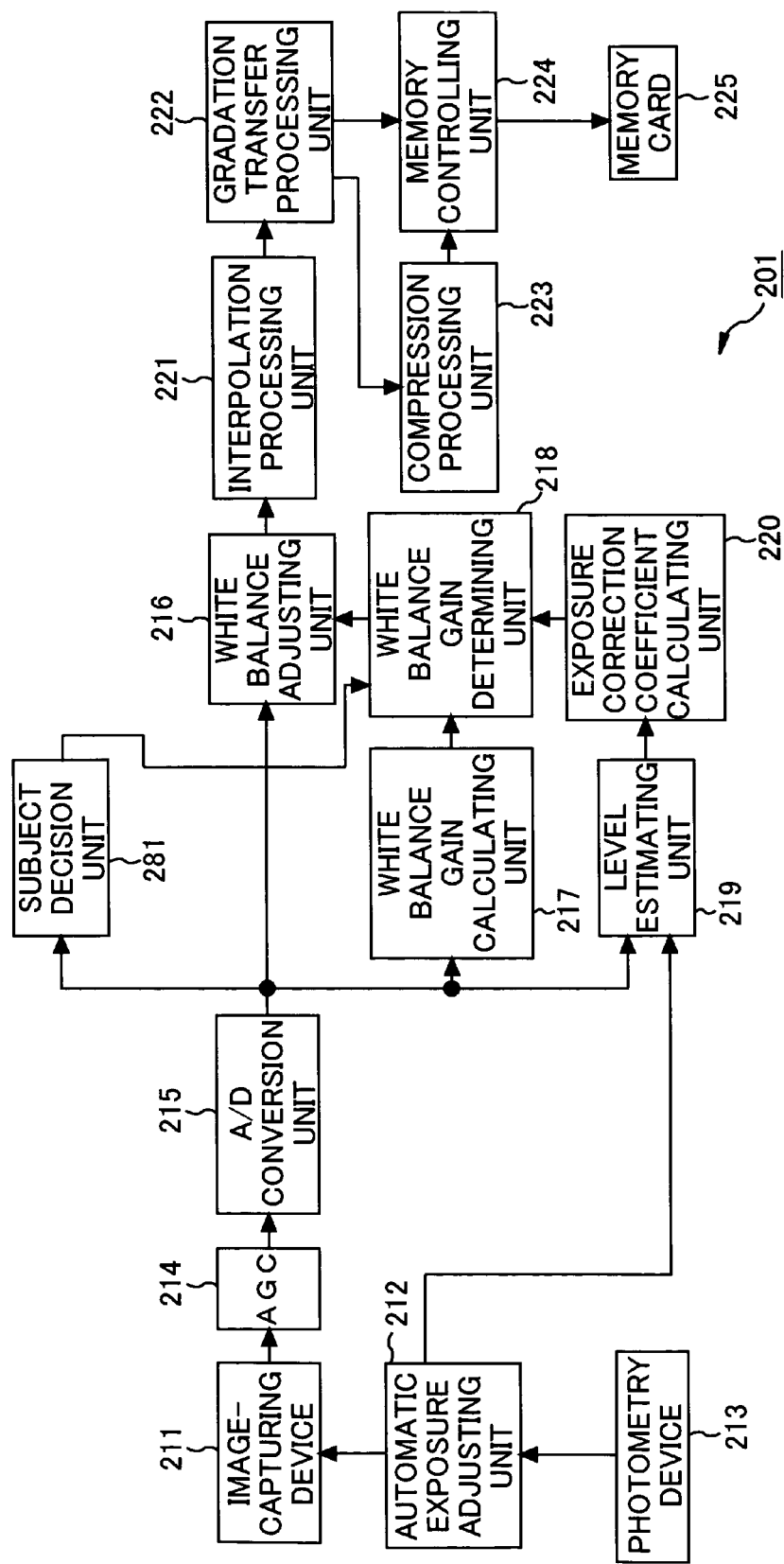
FIG. 16 is a block diagram showing another example of configuration of yet another digital still camera to which the present invention is applied.

The first imaging device may further include a decision part (for example, a subject decision unit 281 of FIG. 16)

which decides a type of a subject of the image captured by the image-capturing part (for example, the types of images such as an image having a personal figure(s) as a subject and an image having a landscape as a subject). The image correcting part can correct the image captured by the image-capturing part based also on the type of the subject of the image decided by the decision part.

The following third to fifth embodiments also provide an image-capturing method. This image-capturing method includes an exposure adjusting step (for example, step S11 of FIG. 10), an image-capturing step (for example, step S12 of FIG. 10), a first calculating step (for example, step S33 of FIG. 11), a second calculating step (for example, step S34 of FIG. 11), and an image correcting step (for example, step S18 of FIG. 10). In the exposure adjusting step, a proper exposure is calculated based on a result of photometry, and an exposure at a time of image capturing is adjusted so as to obtain an image with the proper exposure. In the image-capturing step, an image is captured in accordance with an adjustment by processing of the exposure adjusting step. In the first calculating step, a luminance of a predetermined region of the image captured by processing of the image-capturing step is calculated based on data of the image captured by the processing of the image-capturing step. In the second calculating step, a luminance of the predetermined region is calculated based on the proper exposure calculated by the processing of the exposure adjusting step. In the image correcting step, the image captured by the processing of the image-capturing step is corrected based on a difference (for example, deviation) between the luminance calculated by processing of the first calculating step and the luminance calculated by processing of the second calculating processing.

A program of the present invention is also practiced (in one example, though) with the same individual steps as those of the information processing method of the present invention.

The following third to fifth embodiments also provide a second imaging device. This second imaging device (the digital still camera 201 of FIG. 7, which stores an exposure correction coefficient into a memory card 225 as one of parameters of a RAW file along with image data, without performing an exposure correction by image processing) includes an exposure adjusting part (for example, the automatic exposure adjusting unit 212 of FIG. 7), an image-capturing part (for example, the image-capturing device 211 of FIG. 7), a first calculating part (for example, the luminance calculating unit 242 of FIG. 8, which performs the processing of step S33 in FIG. 11), a second calculating part (for example, the luminance calculating unit 242 of FIG. 8, which performs the processing of step S34 in FIG. 11), a third calculating part (for example, an exposure correction coefficient calculating unit 220 of FIG. 7), and a memory controlling part (for example, a memory controlling unit 224 of FIG. 7). The exposure adjusting part calculates a proper exposure based on a result of photometry, and adjusts an exposure at a time of image capturing so as to obtain an image with the proper exposure. The image-capturing part captures an image in accordance with the adjustment by the exposure adjusting part. The first calculating part calculates a luminance of a predetermined region of the image captured by the image-capturing part, based on data of the image captured by the image-capturing part. The second calculating part calculates a luminance of the predetermined region based on the proper exposure calculated by the exposure adjusting part. The third calculating part calculates a correction coefficient to be used to correct the image captured by the image-capturing part, based on a difference (for example, deviation) between the luminance calculated by the first calculating part and the luminance calculated by the second calculating part. The memory controlling part stores the data of the image captured by the image-capturing part and the correction coefficient calculated by the third calculation part into a recording medium.

Third Embodiment

Hereinafter, the third embodiment of the present invention will be described with reference to the drawings.

Figure 7:
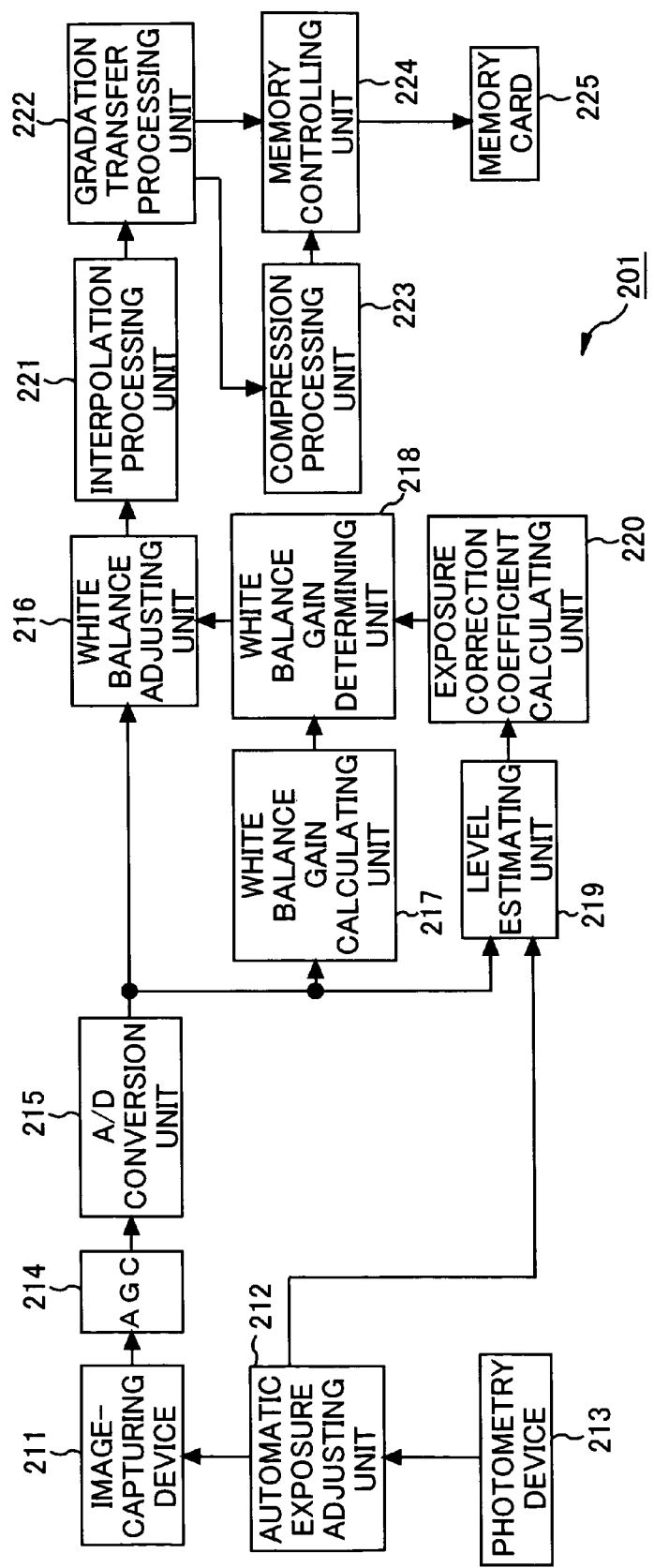
FIG. 7 is a block diagram showing an example of configuration of a digital still camera to which the present invention is applied.

FIG. 7 is a block diagram showing an example of configuration of a digital still camera 201 to which the present invention is applied.

An image-capturing device 211 is made of a charge coupled device (CCD), a complementary metal oxide semiconductor (CMOS), or the like. The image-capturing device 211 receives light that is incident through a not-shown lens, and performs photoelectric conversion. A picture signal obtained by the photoelectric conversion is output to an automatic gain control (AGC) 214. Incidentally, the amount of the light incident on the image-capturing device 211 at the time of capturing is adjusted by an automatic exposure adjusting unit 212 through control on a shutter speed and an aperture.

The automatic exposure adjusting unit 212 calculates a proper exposure from the result of photometry by a photometry device 213. Based on the calculation, the automatic exposure adjusting unit 212 adjusts the shutter speed and the aperture at the time of capturing so that an image is obtained with the proper exposure. Since the shutter speed and the aperture are adjusted by driving blade members or the like physically, some slight errors can occur between the ideal values of the shutter speed and the aperture determined from the calculated proper exposure and the actual amounts of the shutter speed and the aperture driven at the time of capturing.

The automatic exposure adjusting unit 212 outputs information on the proper exposure calculated based on the result of the photometry by the photometry device 213 and information indicating the ideal values of the shutter speed and the aperture for obtaining an image with the proper exposure (hereinafter, referred to as the ideal amounts of control when necessary) to a level estimating unit 219. Incidentally, the exposure adjustment may be performed automatically by the automatic exposure adjusting unit 212 (not by a user operation), or may be performed according to user operations such as aperture priority and shutter speed priority. When the shutter is an electronic shutter, the automatic exposure adjusting unit 212 adjusts the exposure by controlling the exposure time (electronic shutter speed) of the image-capturing device 211 as well as the aperture.

A photometry device 213 measures the brightness of the area to be captured by the image-capturing device 211, and outputs the measurement (the result of the photometry) to the automatic exposure adjusting unit 212. When the photometry device 213 is of external photometry type, it is arranged on the surface of the digital still camera 201 so as to face toward the capturing area of the image-capturing device 211. When it is of TTL (Through The Lens) type, the photometry device 213 is arranged at a position where it can receive the light incident through the lens.

The AGC 214 adjusts the gain of the picture signal input from the image-capturing device 211, and outputs the gain-adjusted picture signal to an A/D (Analog/Digital) conversion unit 215. Incidentally, the picture signal obtained by the image-capturing device 211 is also subjected, when necessary, to such processes as correlated double sampling (CDS) processing and color separation processing for separate R, G, and B color signals.

The A/D conversion unit 215 converts the analog signal input from the AGC 214 into digital data at a predetermined sampling frequency. The A/D conversion unit 215 outputs the resulting image data to each of a white balance adjusting unit 216, a white balance gain calculating unit 217, and the level estimating unit 219.

The white balance adjusting unit 216 makes a white balance adjustment to the image that is input from the A/D conversion unit 215 in the form of data, based on white balance gains determined and input by a white balance gain determining unit 218. The white balance adjusting unit 216 outputs the image data adjusted in white balance to an interpolation processing unit 221. As will be described later, the white balance gain determining unit 218 determines the white balance gains by correcting white balance gains calculated by the white balance gain calculating unit 217 based on the image captured actually, so that the image is obtained with a more proper exposure.

The white balance gain calculating unit 217 calculates the white balance gains for adjusting the white balance so that that the image data input from the A/D conversion unit 215 has constant RGB ratios. For example, with bluish white, the white balance gain calculating unit 217 increases the R gain and decreases the B gain. On the other hand, with reddish white, the B gain is increased or the R gain is decreased. The white balance gain calculating unit 217 outputs the calculated white balance gains to the white balance gain determining unit 218.

The white balance gain determining unit 218 determines the white balance gains for the white balance-adjusting unit 216 to use in adjusting the white balance of the image data. For example, the white balance gain determining unit 218 multiplies the white balance gains calculated in the white balance gain calculating unit 217 by an exposure correction coefficient that is calculated and input by an exposure correction coefficient calculating unit 220. The white balance gains determined by the white balance gain determining unit 218 are output to the white balance adjusting unit 216.

The level estimating unit 219 estimates luminances of the image that is input from the A/D conversion unit 215 in the form of data. For example, the level estimating unit 219 calculates an average of luminances in a predetermined area (region) of an entire single image based on the input data. It also calculates a theoretical luminance of that area (the luminance of the image with the proper exposure calculated by the automatic exposure adjusting unit 212) based on the information indicating the proper exposure, supplied from the automatic exposure adjusting unit 212, and information on the ideal amounts of control and the like. The level estimating unit 219 then calculates a difference (deviation) of the luminance of the image captured actually with respect to the theoretical luminance.

The level estimating unit 219 performs such a deviation calculation on an entire single image by switching the area to be processed in succession, and outputs the calculated deviations of the respective areas to the exposure correction coefficient calculating unit 220. The configuration of the level estimating unit 219 will be detailed later with reference to FIG. 8.

The exposure correction coefficient calculating unit 220 calculates the exposure correction coefficient from the deviations input from the level estimating unit 219, and outputs the calculated exposure correction coefficient to the white balance gain determining unit 218.

The interpolation processing unit 221 interpolates the image data input from the white balance adjusting unit 216, and outputs the interpolated image with enhanced pixels to a gradation transfer processing unit 222.

The gradation transfer processing unit 222 performs multi-tone transfer on each of the pixels of the image enhanced by the interpolation processing unit 221, thereby subdividing the gradation. The image given the multi-tone transfer is output to a compression processing unit 223.

The compression processing unit 223 compresses the image supplied from the gradation transfer processing unit 222 by using JPEG (Joint Photographic Expert Group) system, for example. It outputs the compressed image data to a memory controlling unit 224.

The memory controlling unit 224 stores the compressed image data supplied from the compression processing unit 223 into a memory card 225. The memory card 225 is removable from the digital still camera 201.

Incidentally, the digital still camera 201 can also store the captured image into the memory card 225 as RAW data without any compression. In this case, the image data given the A/D conversion by the A/D conversion unit 215 is supplied to the memory controlling unit 224 without being processed by the white balance adjusting unit 216, the interpolation processing unit 221, or the gradation transfer processing unit 222, and is simply recorded on the memory card 225. Aside from the capturing parameters such as the shutter speed and the aperture, the white balance gains determined by the white balance gain determining unit 218 are also supplied to the memory controlling unit 224 and recorded on the memory card 225 along with the uncompressed image data. Moreover, the image data compressed by JPEG system or the like and the RAW data both may be stored into the memory card 225 at the same time.

Figure 8:
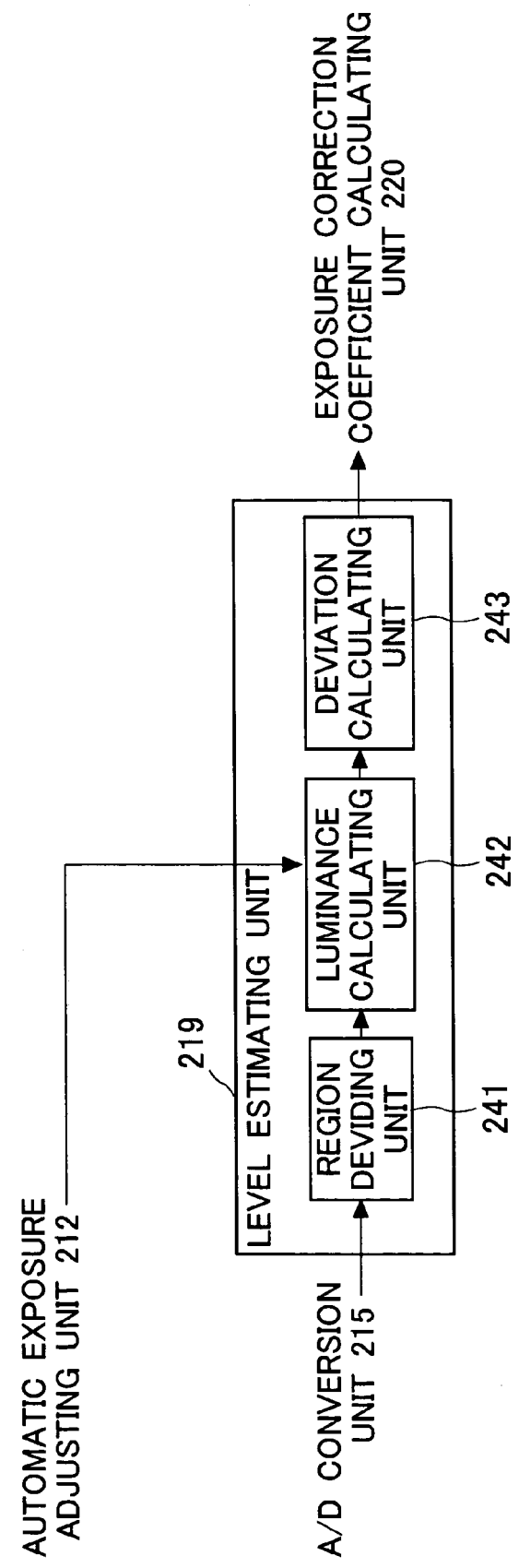
FIG. 8 is a block diagram showing a detailed example of configuration of the estimating unit shown in FIG. 7.

FIG. 8 is a block diagram showing a detailed example of configuration of the level estimating unit 219 shown in FIG. 7.

The level estimating unit 219 is composed of a region dividing unit 241, a luminance calculating unit 242, and a deviation calculating unit 243. The region dividing unit 241 divides an entire single captured image input from the A/D conversion unit 215 into a plurality of small regions, and outputs the image data of each of the divided small regions to the luminance calculating unit 242 in succession.

The luminance calculating unit 242 calculates an average of luminances in the entire single image or a certain area of the entire single image from the image data input from the region dividing unit 241, and outputs the calculated average to the deviation calculating unit 243. Hereinafter, the average of luminances that the luminance calculating unit 242 calculates from the data of the image captured actually will be referred to as captured image average when necessary.

Moreover, based on the information input from the automatic exposure adjusting unit 212, the luminance calculating unit 242 calculates an average of luminances that are assumed theoretically (hereinafter, referred to as theoretical average when necessary) in the same area as the captured image average is calculated of (in the entire single image or a certain area of the entire single image). When the ideal amounts of control differ from the shutter speed and the aperture in the actual capturing, a difference occurs between the captured image average and the theoretical average calculated by the luminance calculating unit 242. The luminance calculating unit 242 outputs the calculated theoretical average to the deviation calculating unit 243.

Based on the captured image average and the theoretical average calculated by the luminance calculating unit 242, the deviation calculating unit 243 calculates the difference between the captured image average and the theoretical average. For example, it calculates a deviation of the captured image average with respect to the theoretical average. The deviation calculating unit 243 outputs the calculated deviation to the exposure correction coefficient calculating unit 220.

Based on the deviation calculated thus, the exposure correction coefficient calculating unit 220 calculates the exposure correction coefficient. The calculation of the captured image average, the theoretical average, and the deviation is performed on the entire single image by switching the area to be processed in succession.

The foregoing has dealt with the case where the deviation is calculated from the average of luminances in a certain area and the average of theoretical luminances in the captured image. Nevertheless, the deviation may be calculated from a sum of luminances in a certain area and a sum of theoretical luminances. That is, any method may be used for luminance calculation as long as a comparison can be made as to a difference between the luminances obtained from the image captured actually and the theoretical luminances assumed for situations where the shutter speed and the aperture are adjusted for a proper exposure by the automatic exposure adjusting unit 212.

Figure 9:
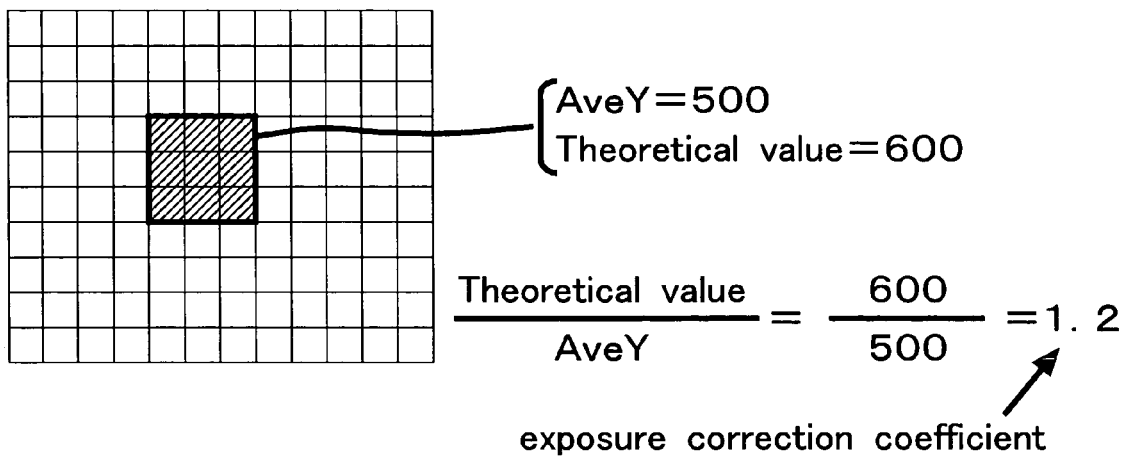
FIG. 9 is a diagram showing an example of calculation of an exposure correction coefficient.

FIG. 9 is a diagram showing a specific example of calculation of the exposure correction coefficient.

For example, suppose that the 12 by 10 (column by row) area in FIG. 9 represents an entire-single image, and the 3 by 3 area shown shaded is the area to be processed. Then, an average of luminances in this area, or a captured image average AveY, and an average of theoretical luminances, or a theoretical average, are calculated to determine a deviation of the captured image average AveY with respect to the theoretical average.

In the example of FIG. 9, the captured image average AveY shall be 500, and the theoretical average 600. A deviation of 1.2 is thus given by the theoretical average/the captured image average AveY (600/500). This deviation of 1.2 is used as the exposure correction coefficient.

Meanwhile, based on the captured image, white balance gains to be used for a white balance adjustment to the pixels included in the shaded area of FIG. 9 are calculated by the white balance gain calculating unit 217 (FIG. 7). Suppose here that the white balance gains are R=2, G=1, and B=1.5 as shown in FIG. 9. In the white balance gain determining unit 218, each of the white balance gains R, G, and B calculated by the white balance gain calculating unit 217 is multiplied by the exposure correction coefficient of 1.2, so that the white balance gains are corrected and determined as R=2.4, G=1.2, and B=1.8.

The white balance gains determined are output to the white balance adjusting unit 216, and used by the level estimating unit 219 and the like to make a white balance adjustment to the pixels in the area to be processed. Until the entire single image has gone through the adjustment, the area to be processed is switched successively to repeat the foregoing processing.

As above, an image is captured with the exposure adjusted by the automatic exposure adjusting unit 212. Then, the image is further subjected to a white balance adjustment based on the white balance gains that are determined in consideration of differences between the theoretical luminances and the luminances of the image captured actually. It is therefore possible to proper exposure differences that occur from the differences between the ideal values of the shutter speed and aperture calculated by the automatic exposure adjusting unit 212 for the sake of a proper exposure and the values of the shutter speed and aperture when the image is captured actually. That is, the image can be obtained with an exposure closer to the theoretical ideal assumption.

Next, referring to the flowchart of FIG. 10, description will be given of the image-capturing processing to be performed by the digital still camera 201.

At step S11, the automatic exposure adjusting unit 212 calculates a proper exposure based on the result of photometry by the photometry device 213, and determines the ideal amounts of control, thereby adjusting the exposure at the time of capturing. The automatic exposure adjusting unit 212 also outputs the information indicating the calculated proper exposure and the information on the ideal amounts of control to the luminance calculating unit 242 of the level estimating unit 219.

When a shutter button arranged on the surface of the digital still camera 201 is pressed by the user, the shutter speed and the aperture are adjusted to the ideal amounts of control and an image is captured at step S12. That is, the image-capturing device 211 receives the incident light, performs photoelectric conversion, and outputs the resulting picture signal to the AGC 214.

At step S13, the AGC 214 adjusts the gain of the picture signal input from the image-capturing device 211, and outputs the gain-adjusted picture signal to the A/D conversion unit 215.

At step S14, the A/D conversion unit 215 converts the analog signal input from the AGC 214 into digital data at a predetermined sampling frequency. The A/D conversion unit 215 outputs the resulting image data to each of the white balance adjusting unit 216, the white balance gain calculating unit 217, and the level estimating unit 219.

At step S15, the white balance gain calculating unit 217 calculates white balance gains based on the image data input from the A/D conversion unit 215, and outputs the calculated white balance gains to the white balance gain determining unit 218.

At step S16, exposure correction coefficient calculation processing is performed. In this exposure correction coefficient calculation processing, the exposure correction coefficient is calculated as described above based on differences between the theoretical luminances and the luminances in a certain target area of the image captured actually. The exposure correction coefficient calculation processing will be described later with reference to the flowchart of FIG. 11.

At step S17, the white balance gain determining unit 218 determines the white balance gains for the white balance adjusting unit 216 to use for a white balance adjustment. For example, the white balance gain determining unit 218 multiplies the white balance gains calculated in the white balance gain calculating unit 217 by the exposure correction coefficient calculated by the exposure correction coefficient calculating unit 220.

At step S18, the white balance adjusting unit 216 makes a white balance adjustment to the image input from the A/D conversion unit 215, based on the white balance gains that are determined and input by the white balance gain determining unit 218. The white balance adjusting unit 216 outputs the image data adjusted in white balance to the interpolation processing unit 221.

At step S19, the interpolation processing unit 221 interpolates the image input from the white balance adjusting unit 216. At step S20, the gradation transfer processing unit 222 performs multi-tone conversion on each of the pixels of the image enhanced by the interpolation processing unit 221, thereby subdividing the gradation.

At step S21, the compression processing unit 223 compresses the image supplied from the gradation transfer processing unit 222 by using JPEG system, for example. The compression processing unit 223 outputs the compressed image data to the memory controlling unit 224. At step S22, the memory controlling unit 224 stores the compressed image data supplied from the compression processing unit 223 into the memory card 225, and terminates the processing.

Next, referring to the flowchart of FIG. 11, description will be given of the exposure correction coefficient calculation processing which is performed at step S16 of FIG. 10.

At step S31, the region dividing unit 241 divides the entire single image input from the A/D conversion unit 215 into a plurality of small regions. The region dividing unit 241 outputs the image data of each of the divided small regions to the luminance calculating unit 242 in succession.

At step S32, the luminance calculating unit 242 calculates the luminances of the respective small regions. Proceeding to step S33, the luminance calculating unit 242 calculates a captured image average, or an average of luminances in the entire single image or a predetermined certain area of the entire single image, based on the luminances of the respective small regions.

At step S33, the luminance calculating unit 242 calculates a theoretical average based on the information supplied from the automatic exposure adjusting unit 212. The theoretical average is an average luminance theoretically assumed of the same area as that of which the captured image average is calculated at step S33. The luminance calculating unit 242 outputs the captured image average calculated at step S33 and the theoretical average calculated at step S34 to the deviation calculating unit 243.

At step S35, the deviation calculating unit 243 calculates a deviation of the captured image average with respect to the theoretical average, based on the captured image average and the theoretical average calculated by the luminance calculating unit 242.

At step S36, the exposure correction coefficient calculating unit 220 calculates the exposure correction coefficient from the deviation calculated by the deviation calculating unit 243, and outputs the calculated exposure correction coefficient to the white balance gain determining unit 218. Subsequently, the processing of step S17 and later, described above in FIG. 10, is performed.

Figure 10:
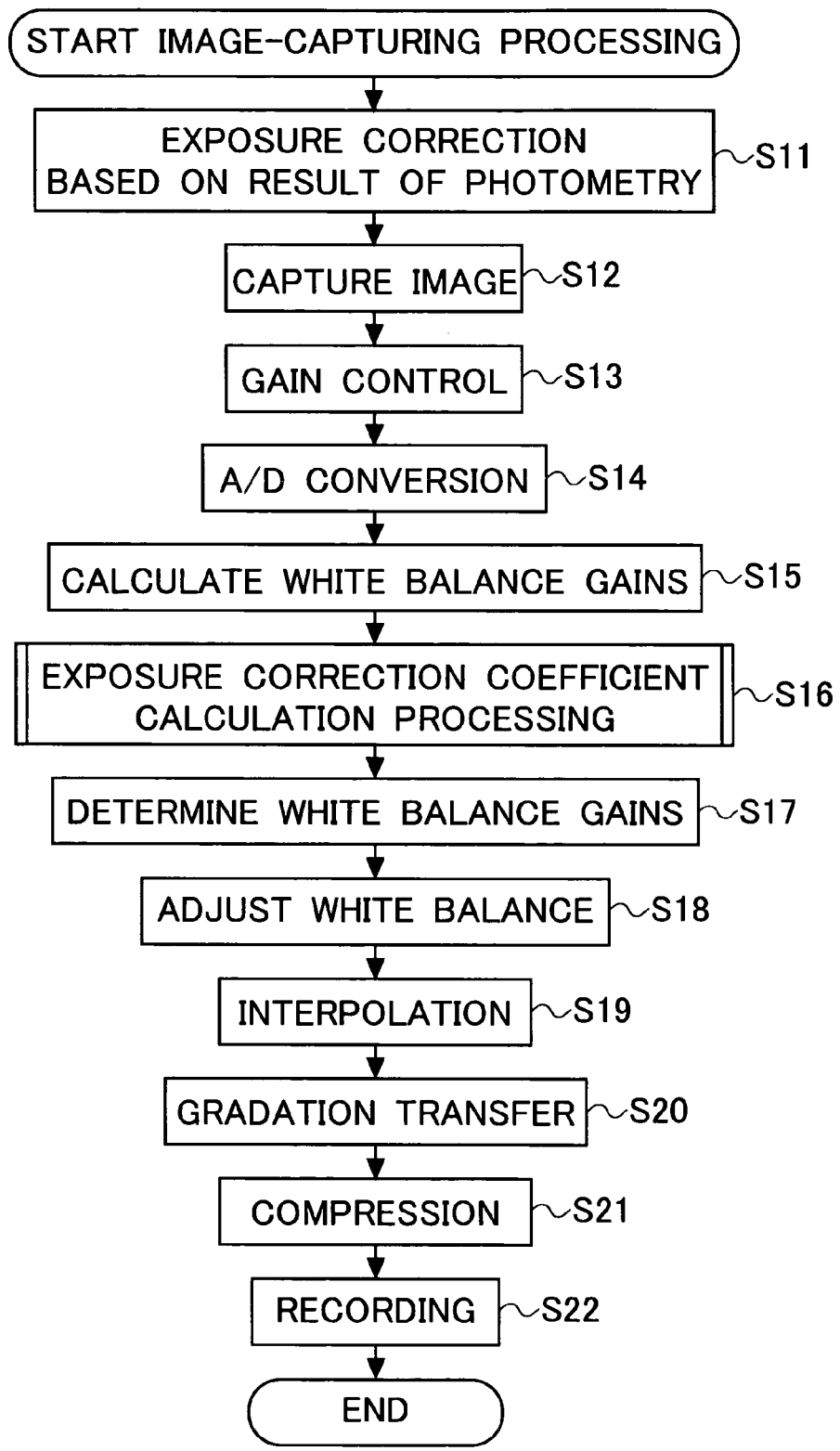
FIG. 10 is a flowchart for explaining image-capturing processing to be performed by the digital still camera.
Figure 11:
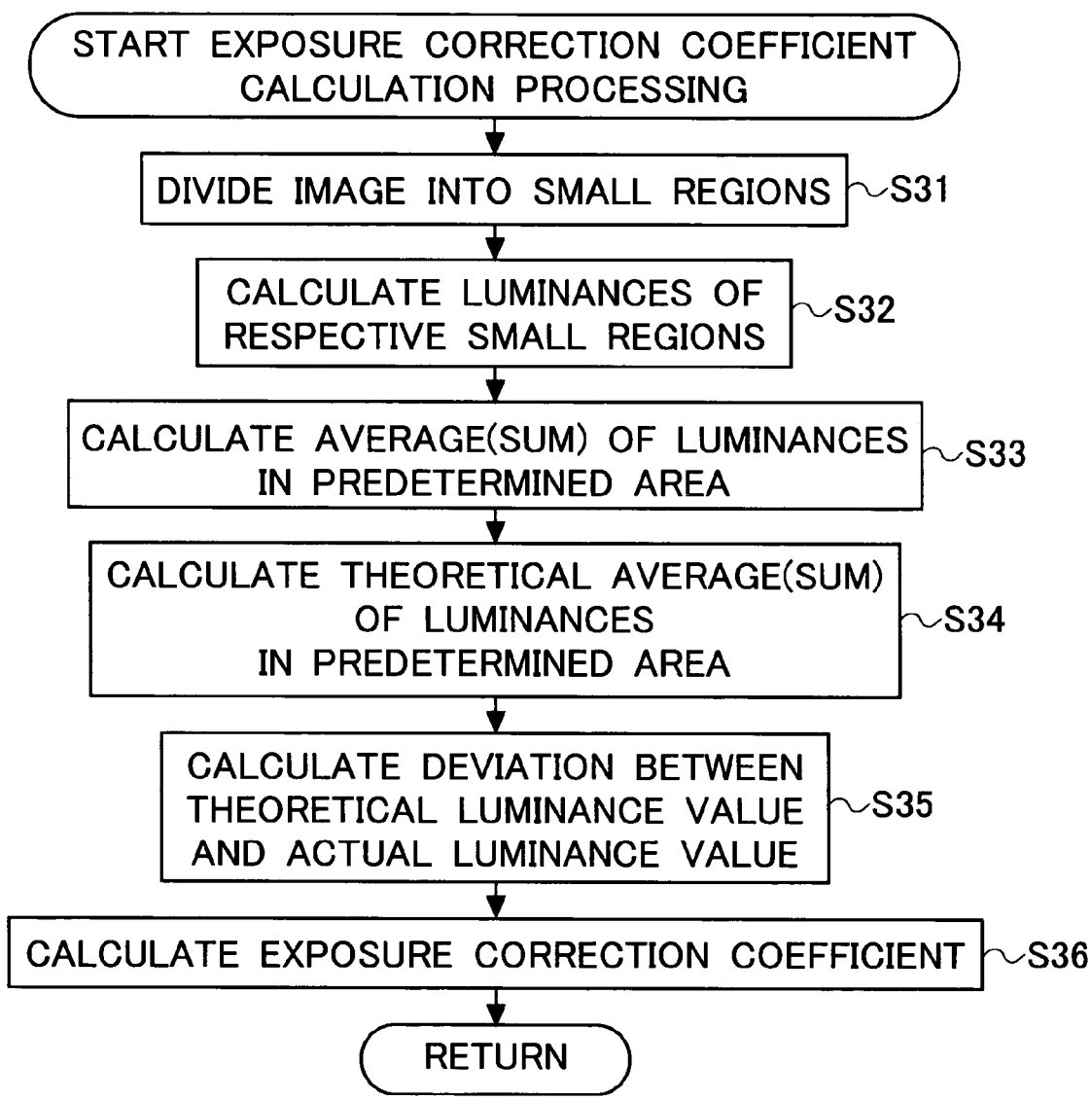
FIG. 11 is a flowchart for explaining exposure correction coefficient calculation processing to be performed at step S16 of FIG. 10.

The foregoing processing of FIGS. 10 and 11 is performed each time an image is captured. It follows that the exposure is adjusted not only by the adjustment based on the shutter speed and the aperture, but also through the image processing which takes account of the differences between the theoretical luminances of the image and the luminances of the image captured actually. That is, images are obtained with more preferable exposures.

Fourth Embodiment

Hereinafter, a fourth embodiment of the present invention will be described in detail with reference to the drawings.

FIG. 12 is a block diagram showing another example of configuration of the digital still camera 201.

In FIG. 12, the same parts as those of FIG. 7 are designated by identical reference numerals. Redundant description will be omitted as appropriate.

The digital still camera 201 of FIG. 12 is configured so that a lens unit 251 is detachably mounted (the lens is replaceable) on its body (the components of FIG. 12 other than the lens unit are arranged in this body).

In FIG. 12, the lens unit 251 to be mounted on the digital still camera 201 has a lens 261 for condensing light to the image-capturing device 211, and a lens information memory unit 262. The lens information memory unit 262 contains lens information including discrimination information on the lens unit 251. Through a terminal or the like formed at the position where the lens unit 251 and the body make contact with each other, the lens information memory unit 262 is electrically connected to a controlling unit 272 which is arranged on the body side.

When the lens unit 251 is mounted, the controlling unit 272 reads the discrimination information stored in the lens information memory unit 262, and discriminates the lens unit mounted at that time based on the read discrimination information. The controlling unit 272 also outputs the read discrimination information to an exposure correction coefficient memory unit 271. The exposure correction coefficient memory unit 271 thus stores the exposure correction coefficient calculated by the exposure coefficient calculating unit 220, in association with the discrimination information when an image is captured with the lens unit 251 mounted.

That is, the exposure correction coefficient memory unit 271 stores, for example, a history of lenses and exposure correction coefficients as shown in FIG. 13.

FIG. 13 shows an example where a lens A and a lens B are registered. Here, exposure correction coefficients calculated when images are captured by using the lenses A and B are stored in association with the respective lenses.

For example, the exposure correction coefficient at the first capture (scene 1) with the lens A is 1.5, and the exposure correction coefficient calculated at the second capture (scene 2) is also 1.5. Similarly, the exposure correction coefficient calculated at the third capture (scene 3) with the lens A is 1.4, the exposure correction coefficient calculated at the fourth capture (scene 4) is 1.5, the exposure correction coefficient calculated at the fifth capture (scene 5) is 1.5, and so on.

In the example of FIG. 13, the exposure correction coefficient calculated at the first capture with the lens B is 0.8, and the exposure correction coefficient calculated at the second capture is 1.5. Similarly, the exposure correction coefficient calculated at the third capture with the lens B is 2.0, the exposure correction coefficient calculated at the fourth capture is 1.2, the exposure correction coefficient calculated at the fifth capture is 1.0, and soon.

The controlling unit 272 refers to the history of exposure correction coefficients stored in the exposure correction coefficient memory unit 271, and controls the exposure adjustment based on the result of photometry by the photometry device 213 (the exposure adjustment by the automatic exposure adjusting unit 212).

To be more specific, suppose that the exposure correction coefficients for respective scenes are generally constant and thus are dependent on the lens as is the case with the lens A of FIG. 13. When the controlling unit 272 recognizes this from the history of the exposure correction coefficients, it controls the exposure adjustment by the automatic exposure adjusting unit 212, for example, based on an average of the exposure correction coefficients. In other words, if the controlling unit 272 recognizes that the exposure correction coefficients vary scene by scene and thus depend on the scene as is the case with the lens B of FIG. 13, it exercises no control on the exposure adjustment.

For example, take the case where images captured with a certain lens tend to be underexposed, and an average of the exposure correction coefficients is relatively high. Then, the controlling unit 272 controls the exposure adjustment by the automatic exposure adjusting unit 212 so that the shutter speed becomes smaller than or the aperture becomes higher than the ideal amounts of control calculated by the automatic exposure adjusting unit 212 (in order to obtain higher luminance). This control is aimed to obtain the intended luminance in advance at the time of capturing an image, i.e., to reduce the amount of correction on the luminance through the image processing, instead of correcting the luminance accordingly by the image processing based on the luminances of the captured image and the theoretical luminances.

On the other hand, when images captured with a certain lens tend to be overexposed and an average of the exposure correction coefficients is high, the controlling unit 272 controls the exposure adjustment by the automatic exposure adjusting unit 212 so that the shutter speed becomes higher than or the aperture becomes lower than the ideal amounts of control calculated by the automatic exposure adjusting units 212.

The automatic exposure adjusting unit 212 of FIG. 12 calculates the proper exposure based on the result of photometry by the photometry device 213, and determines the ideal amounts of control of the shutter speed and the aperture based on the proper exposure. The automatic exposure adjusting unit 212 further corrects the determined ideal amounts of control under the control of the controlling unit 272, and drives the shutter and the aperture in accordance with the corrected amounts of control.

Consequently, the automatic exposure adjusting unit 212 can make an optimum exposure adjustment lens by lens. That is, the image itself yet to be corrected by the image processing is captured with a more preferable exposure.

Next, referring to the flowchart of FIG. 14, description will be given of the exposure correction coefficient calculation processing to be performed by the digital still camera 201 of FIG. 12.

Figure 14:
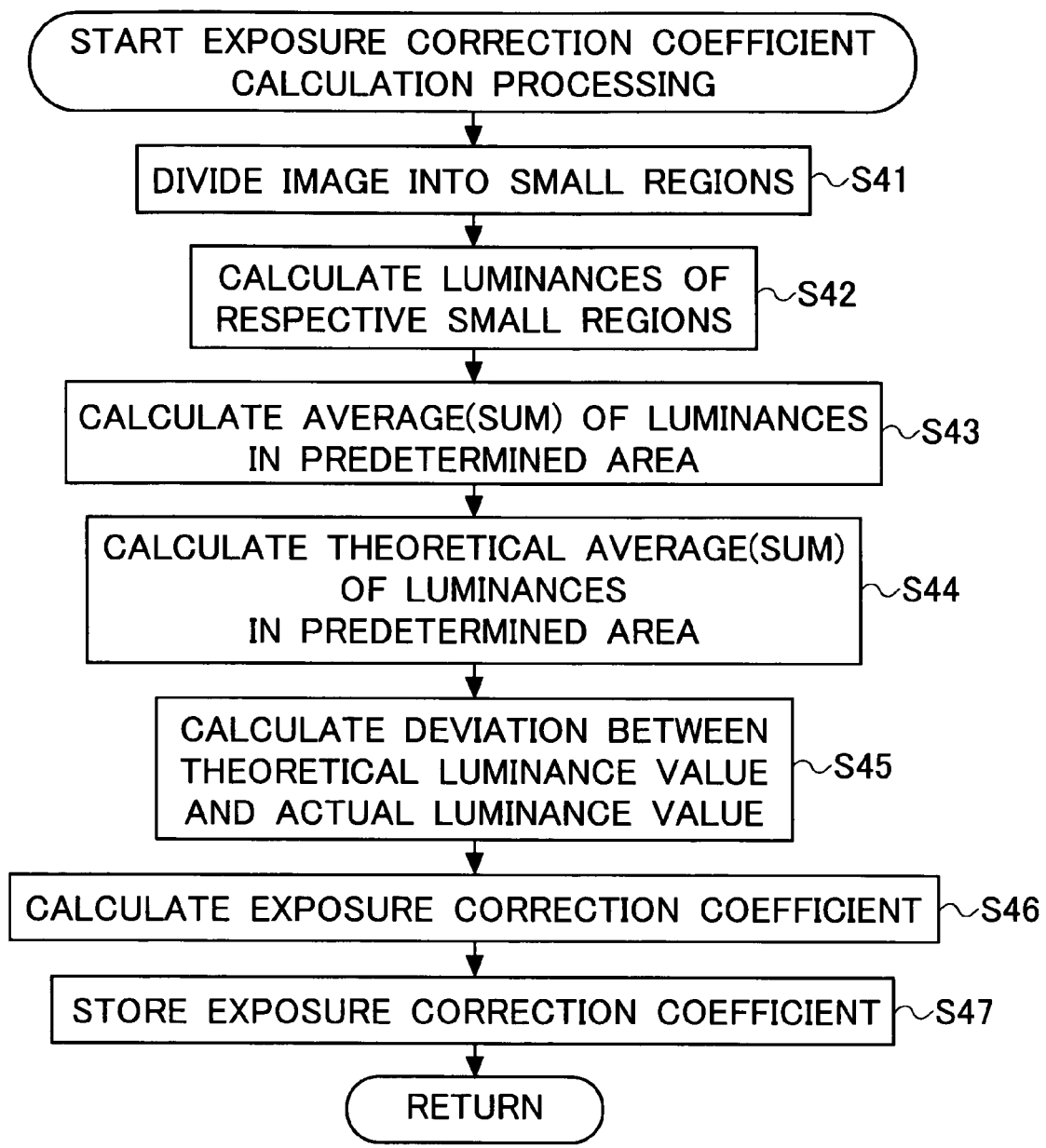
FIG. 14 is a flowchart for explaining exposure correction coefficient calculation processing to be performed by the digital still camera of FIG. 12.

The digital still camera 201 of FIG. 12 also performs the image-capturing processing of FIG. 10, at step S16 of which the processing of FIG. 14 is performed. The processing of FIG. 14 is basically the same as that of FIG. 11.

That is, at step S41, the region dividing unit 241 divides the entire single image input from the A/D conversion unit 215 into a plurality of small regions, and outputs the image data of each of the divided regions to the luminance calculating unit 242 in succession. At step S42, the luminance calculating unit 242 calculates the luminance of the respective small regions. Proceeding to S43, the luminance calculating unit 242 calculates a captured image average, or an average of the luminances in a predetermined area, from the calculated luminances of the small regions. At step S44, the luminance calculating unit 242 also calculates a theoretical average, or a theoretical average of the luminances in the predetermined area, based on the output of the automatic exposure adjusting unit 212.

At step S45, the deviation calculating unit 243 calculates a deviation of the captured image average with respect to the theoretical average calculated at step S43. At step S46, the exposure correction coefficient calculating unit 220 calculates the exposure correction coefficient from the deviation calculated by the deviation calculating unit 243, and outputs the exposure correction coefficient to the white balance gain determining unit 218.

At step S47, the exposure correction coefficient calculating unit 220 also outputs the calculated exposure correction coefficient to the exposure correction coefficient memory unit 271, so that the exposure correction coefficient is stored in association with the discrimination information on the lens that is mounted at that time. The foregoing processing is repeated each time an image is captured. As a result, a history of exposure correction coefficients such as shown in FIG. 13 is registered into the exposure correction coefficient memory unit 271.

Figure 15:
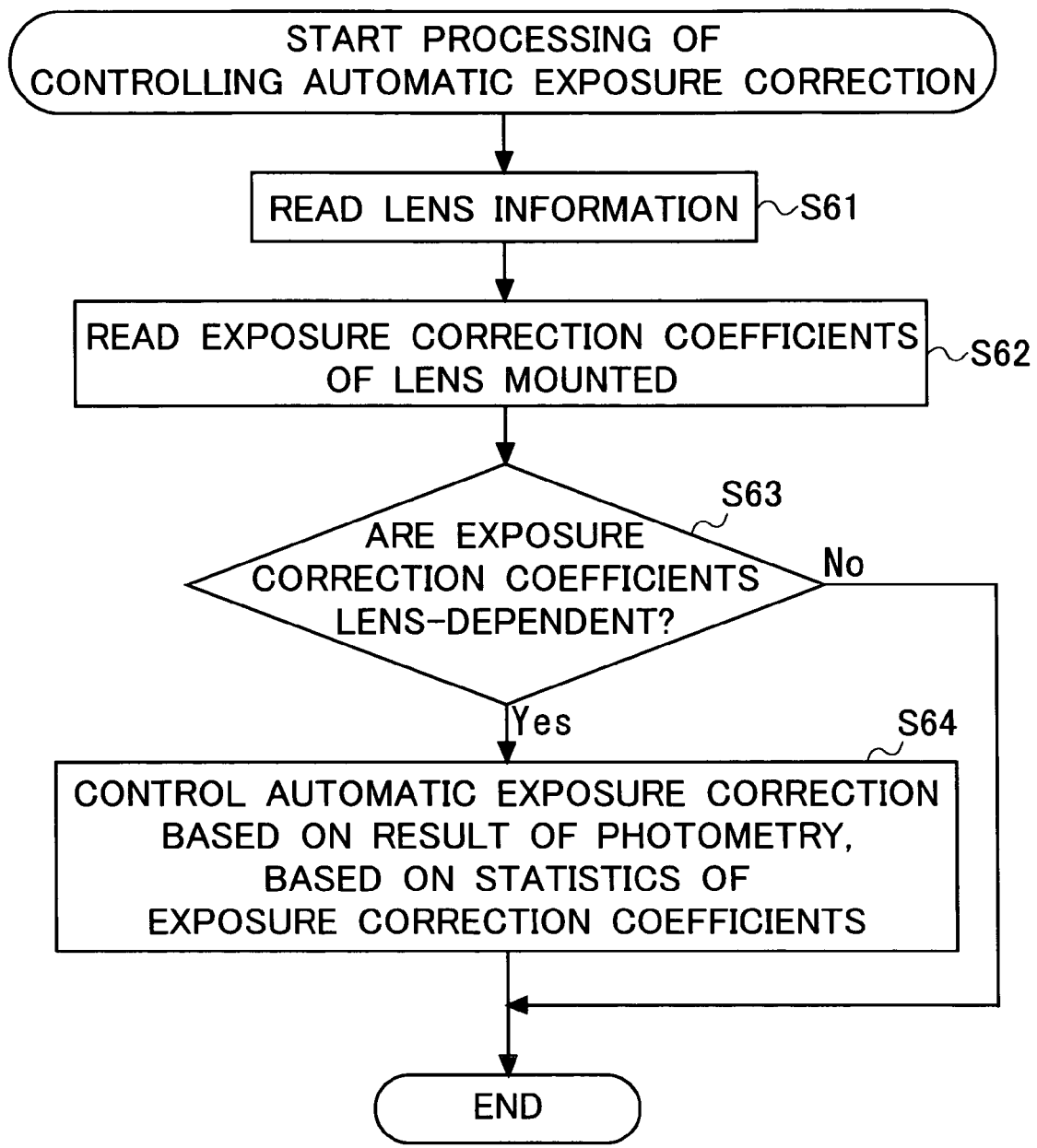
FIG. 15 is a flowchart for explaining control processing of a controlling unit.

Next, referring to the flowchart of FIG. 15, description will be given of the processing of the controlling unit 272. Here, the controlling unit 272 controls the exposure adjustment by the automatic exposure adjusting unit 212 based on the history of exposure correction coefficients which is registered in the exposure correction coefficient memory unit 271 by repeating the processing of FIG. 14.

When the lens unit 251 is mounted, at step S61, the controlling unit 272 reads the discrimination information on the lens unit 251 from the lens information memory unit 262 and discriminates the mounted lens.

At step S62, the controlling unit 272 reads the history of exposure correction coefficients of the mounted lens unit 251 from the exposure correction coefficient memory unit 271 based on the discrimination information read at step S61.

At step S63, the controlling unit 272 determines whether the exposure correction coefficients are lens-dependent or not. If the controlling unit 272 determines that the exposure correction coefficients vary largely and thus are not lens-dependent, or are scene-dependent, it terminates the processing. In this case, the exposure adjustment by the automatic exposure adjusting unit 212 is not controlled by the controlling unit 272. At the time of capturing an image, the automatic exposure adjusting unit 212 makes an exposure adjustment under its own judgment based on the result of photometry by the photometry device 213.

On the other hand, if the controlling unit 272 determines at step S63 that the exposure correction coefficients are lens-dependent, it proceeds to step S64. Here, the controlling unit 272 controls the exposure adjustment by the automatic exposure adjusting unit 212 based on an average or the like of the exposure correction coefficients.

Take, for example, the case of capturing an image by using a lens that has the propensity for underexposure when accompanied with the exposure adjustment by the automatic exposure adjusting unit 212 alone. Here, the controlling unit 272 controls the shutter speed and the aperture so that the image is captured with a desired luminance in advance, not that the exposure is corrected only by the image processing that has been described with reference to FIG. 9 and the like.

Correcting the exposure through the image processing might sometimes cause noticeable noise depending on the amount of correction. Since the exposure can thus be adjusted in the capturing stage in advance, it is possible to reduce the amount of exposure to be corrected by the image processing, with a reduction in the noise. In addition, since the exposure is adjusted in the capturing stage and then the exposure of the captured image is adjusted further by the image processing, it is possible to obtain the image with a more preferable exposure.

Fifth Embodiment

Hereinafter, a fifth embodiment of the present invention will be described in detail with reference to the drawings.

FIG. 16 is a block diagram showing yet another example of configuration of the digital still camera 201 shown in FIG. 7.

The digital still camera 201 of FIG. 16 is the same as the digital still camera 201 of FIG. 7 except in that a subject decision unit 281 is added thereto. The subject decision unit 281 decides the contents of the captured image. More specifically, based on such factors as the amounts of skin colors and the amount of green color included in the image, the subject decision unit 281 decides the type of the image, e.g., whether one captured with a personal figure(s) as the subject or one captured with a landscape as the subject. Moreover, based on the decision result, the subject decision unit 281 corrects the white balance gains determined by the white balance gain determining unit 218.

Specifically, when the subject decision unit 281 decides that the captured image is one captured with a personal figure(s) as the subject, it corrects the white balance gains determined by the white balance gain determining unit 218 as described above (the white balance gains determined by multiplying the white balance gains calculated in the white balance gain calculating unit 217 by the exposure correction coefficient) slightly toward overexposure. When the subject decision unit 281 decides that the captured image is one captured with a landscape as the subject, it corrects the white balance gains determined by the white balance gain determining unit 281 slightly toward underexposure.

Since images having personal figures as their subjects show finer images of the persons when slightly overexposed, the foregoing correction by the subject decision unit 281 makes it possible to obtain the images with more preferable exposures.

The foregoing third to fifth embodiments have dealt with the cases where the apparatus having the above-described function of correcting an exposure based on a difference between the luminances of a captured image and the luminances assumed theoretically is a digital still camera. Nevertheless, the function may be incorporated into any type of apparatus as long as the apparatus has image-capturing facilities. For example, the function may be incorporated into digital video cameras, as well as cellular phones, PDAs (Personal Digital Assistants), personal computers, and the like having image-capturing facilities.

Incidentally, the function of correcting an exposure based on a difference between the luminances of a captured image and the luminances assumed theoretically may be added to a digital still camera by installing a program that achieves the function (by upgrading the firmware). In this case, for example, the program for achieving the exposure correcting function is provided to the user from a predetermined server over the Internet or the like, and is installed in the digital still camera via the removable memory card 225 or the like. Alternatively, the personal computer to which the program for achieving the exposure correcting function is downloaded may be connected with the digital still camera via a cable or the like, so that the installation is carried out from the personal computer.

What is claimed is:

1. A camera comprising: an image-capturer which captures a field of object to generate an image; a photometry unit which measures a luminance of a predetermined area of said field of object corresponding to one of a plurality of photometry modes, the predetermined area being different for each of the photometry modes;
   a calculator which calculates a ratio between a luminance value of a portion of an image captured according to the luminance measured by said photometry unit and a target luminance value of the predetermined area, the portion corresponding to the predetermined area in compliance with one of the photometry modes; and
   a correcting unit which corrects the image generated by said image-capturer according to the ratio in compliance with one of the photometry modes,
   wherein said calculator determines the target luminance value according to a luminance of a first area of the field of object measured by said photometry unit and to a luminance of a second area different from the first area, and calculates a ratio between a luminance value of a portion of the image and the determined target luminance value, the portion of the image corresponding to the first area.

2. The camera according to claim 1, wherein:
   said photometry unit divides the field of object into a plurality of areas and performs photometry of the plurality of areas, thereby measuring a luminance of each of the plurality of areas; and
   said calculator determines the target luminance value according to a representative value and the luminance of the predetermined area measured by said photometry unit, and calculates a ratio between the luminance value of the portion corresponding to the predetermined area and the determined target luminance value, the representative value being obtained according to the luminance of each of the plurality of areas measured by said photometry unit.

3. The camera according to claim 1, further comprising a setup unit which sets a condition for exposure compensation at a time when the image-capturer captures an image, and wherein
   said calculator determines said target luminance value based on the condition for exposure compensation.

4. The camera according to claim 1, wherein the photometry modes include at least:
   a first mode which measures a luminance of a first area of the field of the object, and
   a second mode which measures a luminance of a second area which is larger than the first area and includes said first area.

5. A method for image processing in a camera, the method comprising the steps of: acquiring an image to be processed and a photometry area of a field of object as an imaging condition in which the image is captured with an image-capturer of the camera;
   calculating a ratio between a luminance value of a portion of the image to be processed and a predetermined target luminance value with a calculator of the camera, the portion corresponding to the photometry area in compliance with one of a plurality of photometry modes, the portion being different for each of the photometry modes; and
   correcting the image to be processed according to the ratio in compliance with one of the photometry modes with a correcting unit of the camera; and
   acquiring a luminance of the photometry area as the imaging condition with the image-capturer of the camera and wherein
   in the calculating step, the target luminance value is determined according to a luminance of a first area of the field of object and to a luminance of a second area different from the first area, and a ratio between a luminance value of a portion of the image to be processed and the determined target luminance value is calculated, the portion corresponding to the first area.

6. The method of claim 5, further comprising the steps of:
   dividing the field of object into a plurality of areas and performing photometry of each of the plurality of areas when capturing the image to be processed, and acquiring a luminance of each of the plurality of areas as the imaging condition with a photometry unit of the camera, and wherein
   in the calculating step, the target luminance value is determined according to a representative value and a luminance of the photometry area acquired in the luminance acquiring step, and a ratio between a luminance value of a portion of the image to be processed and the determined target luminance value is calculated, the representative value being obtained according to the luminance of each of the plurality of areas, the portion corresponding to the photometry area acquired in the photometry area acquiring step.

7. The method of claim 5, further comprising the steps of:
acquiring a condition for exposure compensation as the imaging condition, and wherein
in the calculating step, the target luminance value is determined based on the condition for exposure compensation.

8. An imaging device comprising:
an exposure adjuster which calculates a proper exposure based on a result of photometry, and adjusts an exposure at a time of image capturing so as to obtain an image with the proper exposure;
an image-capturer which captures an image in accordance with an adjustment by said exposure adjuster;
a first detector which calculates a luminance of a predetermined region of an image captured by said image-capturer, based on data of the image captured by said image-capturer;
a second detector which calculates a luminance of the predetermined region according to the proper exposure calculated by said exposure adjuster;
an image corrector which corrects the image captured by said image-capturer according to a difference between the luminance calculated by said first detector and the luminance calculated by said second detector;
a memory which stores a correction coefficient calculated by said image corrector in correcting the image, in association with discrimination information on a lens that is mounted when the image is captured; and
a controller which acquires discrimination information on the mounted lens, and controls an exposure adjustment by said exposure adjuster according to a history of the correction coefficient which is stored in said memory in association with the acquired discrimination information.

9. An imaging device comprising:
an exposure adjuster which calculates a proper exposure based on a result of photometry, and adjusts an exposure at a time of image capturing so as to obtain an image with the proper exposure;
an image-capturer which captures an image in accordance with an adjustment by said exposure adjuster;
a first detector which calculates a luminance of a predetermined region of an image captured by said image-capturer, based on data of the image captured by said image-capturer;
a second detector which calculates a luminance of the predetermined region according to the proper exposure calculated by said exposure adjuster;
an image corrector which corrects the image captured by said image-capturer according to a difference between the luminance calculated by said first detector and the luminance calculated by said second detector;
a decision part which decides a type of a subject of the image captured by said image-capturer, whether one captured with a personal figure as the subject or one captured with a landscape as the subject, and wherein
said image corrector corrects the image captured by said image-capturer according to the type of the subject of the image decided by said decision part.

10. A method for capturing images with a camera, the method comprising:
an exposure adjusting step of calculating a proper exposure based on a result of photometry, and adjusting an exposure at a time of image capturing so as to obtain an image with the proper exposure with an exposure adjuster of the camera;
an image-capturing step of capturing an image in accordance with an adjustment made in the exposure adjusting step with an image-capturer of the camera;
a first calculating step of calculating a luminance of a predetermined region of an image captured in the image-capturing step, based on data of the image captured in the image-capturing step with a first detector of the camera;
a second calculating step of calculating a luminance of the predetermined region according to the proper exposure calculated in the exposure adjusting with a second detector of the camera;
an image correcting step of correcting the image captured in the image-capturing step, according to a difference between the luminance calculated in the first calculating step and the luminance calculated in the second calculating step with an image connector of the camera;
a storing step of storing within a memory of the camera a correction coefficient calculated in said image correcting step in association with discrimination information on a lens that is mounted on the camera when the image is captured;
an acquiring step of acquiring discrimination information on the mounted lens; and
a controlling step of controlling said exposure adjusting step according to a history of the correction coefficient in association with the acquired discrimination information with a controller of the camera.

11. An imaging device comprising:
an exposure adjuster which calculates a proper exposure based on a result of photometry, and adjusts an exposure at a time of image capturing so as to obtain an image with the proper exposure;
an image-capturer which captures an image in accordance with an adjustment by said exposure adjuster;
a first calculator which calculates a luminance of a predetermined region of an image captured by said image-capturer, based on data of the image captured by the image-capturer;
a second calculator which calculates a luminance of the predetermined region according to the proper exposure calculated by said exposure adjuster;
a third calculator which calculates a correction coefficient to be used to correct the image captured by said image-capturer, according to a difference between the luminance calculated by said first calculator and the luminance calculated by said second calculator; and
a memory controller which stores the correction coefficient calculated by said third calculator in association with individual discrimination information on a lens that is mounted when the image is captured and the data of the image captured by said image-capturer into a recording medium.

* * * * *